US010138163B2

(12) United States Patent
Kutlubay et al.

(10) Patent No.: US 10,138,163 B2
(45) Date of Patent: Nov. 27, 2018

(54) PROCESS FOR MANUFACTURING A MILK OF SLAKED LIME OF GREAT FINENESS AND MILK OF GREAT FINENESS THEREBY OBTAINED

(71) Applicant: S. A. Lhoist Recherche et Developpement, Ottingnies-Louvain-la-Neuve (BE)

(72) Inventors: Galen Kutlubay, Dallas, TX (US); Deborah Ballard, Fort Worth, TX (US); Bernard Laurent, Lustin (BE); Augustin Querton, Brussels (BE)

(73) Assignee: S. A. Lhoist Recherche et Developpement, Ottignies-Louvain-la- (BE)

( * ) Notice: Subject to any disclaimer, the term of this patent is extended or adjusted under 35 U.S.C. 154(b) by 26 days.

(21) Appl. No.: 15/323,620

(22) PCT Filed: Sep. 7, 2015

(86) PCT No.: PCT/EP2015/070367
§ 371 (c)(1),
(2) Date: Jan. 3, 2017

(87) PCT Pub. No.: WO2016/037972
PCT Pub. Date: Mar. 17, 2016

(65) Prior Publication Data
US 2017/0152175 A1    Jun. 1, 2017

Related U.S. Application Data

(60) Provisional application No. 62/047,357, filed on Sep. 8, 2014.

(30) Foreign Application Priority Data

May 7, 2015    (WO) .................. PCT/EP2015/060114

(51) Int. Cl.

| | | |
|---|---|---|
| *C04B 2/06* | (2006.01) | |
| *C01F 11/02* | (2006.01) | |
| *C04B 28/10* | (2006.01) | |
| *B01D 53/80* | (2006.01) | |
| *C02F 1/52* | (2006.01) | |
| *C02F 1/66* | (2006.01) | |
| *C04B 2/04* | (2006.01) | |
| *C04B 40/00* | (2006.01) | |

(52) U.S. Cl.
CPC ............... *C04B 2/06* (2013.01); *B01D 53/80* (2013.01); *C01F 11/02* (2013.01); *C02F 1/5236* (2013.01); *C02F 1/66* (2013.01); *C04B 2/045* (2013.01); *C04B 28/10* (2013.01); *C04B 40/0046* (2013.01); *B01D 2251/404* (2013.01); *C01P 2004/03* (2013.01); *C01P 2004/51* (2013.01); *C01P 2004/61* (2013.01); *C01P 2006/22* (2013.01)

(58) Field of Classification Search
CPC ............. C01F 11/02; C04B 2/045; C04B 2/06
See application file for complete search history.

(56) References Cited

U.S. PATENT DOCUMENTS

| | | | |
|---|---|---|---|
| 3,511,600 A | 5/1970 | Kim | |
| 5,275,650 A | 1/1994 | Mongoin et al. | |
| 6,451,281 B1 | 9/2002 | Ebeling et al. | |
| 6,500,400 B1* | 12/2002 | Kinnen | C01F 11/181 423/432 |
| 7,202,197 B2* | 4/2007 | Huege | C01F 11/02 423/640 |
| 7,361,324 B2* | 4/2008 | Liu | C01F 11/181 106/464 |
| 2004/0175324 A1 | 9/2004 | Hassibi | |

FOREIGN PATENT DOCUMENTS

| | | |
|---|---|---|
| EP | 1840097 A1 | 10/2007 |
| FR | 2995301 A1 | 3/2014 |
| WO | 2014064234 A1 | 5/2000 |
| WO | 2002092701 A1 | 11/2002 |

OTHER PUBLICATIONS

General Tresussart: "On Hydraulic and Common Mortars"; Journal of the Franklin Institute; vol. 24, No. 4; Oct. 1837; pp. 229-243.
International Search Report; WO 2016/037972 AI; dated Mar. 17, 2016; 3 pages; Lhoist Recherche.
Written Opinion of the ISA; PCT/EP2015/070367; 6 pages; dated Mar. 17, 2016; Lhoist Recherche.

* cited by examiner

*Primary Examiner* — Stuart L Hendrickson
(74) *Attorney, Agent, or Firm* — Whitaker Chalk Swindle & Schwartz PLLC; Charles D. Gunter, Jr.

(57) ABSTRACT

A process is shown for manufacturing a milk of lime of great fineness which includes at least the steps of providing one lime compound chosen in the group consisting of prehydrated lime, a paste of lime obtained by addition of water to quicklime instead of addition of quicklime to water and their mixture, and forming a milk of slaked lime of great fineness with the chosen lime compound. The paste of lime is obtained by progressive addition of water to quicklime under agitation conditions.

14 Claims, 13 Drawing Sheets

PROCESS FOR MANUFACTURING A MILK OF SLAKED LIME OF GREAT FINENESS AND MILK OF GREAT FINENESS THEREBY OBTAINED

The present invention relates to a process for manufacturing a milk of lime of great fineness.

Lime is a calcium-magnesium based compound hereinafter called calcium based compound.

Calcium based compounds such as CaO and Ca(OH)$_2$ have many practical uses. For instance, these substances are used in treating drinking water, waste water and sewage, in the flue gases treatment, as soil neutralizing agents and nutrients, for ground stabilization for construction, and as components of building materials.

Calcium oxide, CaO, is often referred to as "quicklime", while calcium hydroxide, Ca(OH)$_2$, is referred to as "hydrated lime", both sometimes being informally referred to as "lime". Quicklime is usually in the form of lumps or pebbles but it can also be a powder. Dry hydrated lime is usually a powder.

According to present industry practices, in order to further process these compounds and improve the ease with which they are handled, dry CaO or dry Ca(OH)$_2$ may be mixed with water to form an aqueous suspension, i.e., a slurry, also called milk of lime, which is a fluid suspension of slaked lime, also referred to as hydrated lime (calcium hydroxide—Ca(OH)$_2$), which can obviously include impurities, in particular silica, alumina, unburnt limestone (CaCO$_3$), magnesium oxide or magnesium hydroxide to the extent of a few percent.

Such a suspension is obtained either by slaking quicklime (calcium oxide—CaO) with a large excess of water, or by mixing hydrated lime with water.

The resulting aqueous suspensions are characterized by the concentration of the mass of the solid matter (% solids), the chemical reactivity of the slurry to neutralize an acid and the distribution of the sizes of the particles in suspension (controlling in part viscosity).

These characteristics determine the properties of the slurry, mainly its viscosity and its reactivity.

When a milk of lime is obtained from hydrated lime, hydrated lime particles are suspended in water. The hydrated lime is produced by common atmospheric hydrators which may or may not have size classifying systems where quicklime is added to water in a pre-mixer, at a specific mass ratio and allowed to mix together with said water in what is termed a seasoning chamber. The temperature in the hydrator is less than 100° C. (212° F.). The particle size distribution will vary depending upon the nature of the quicklime starting material used, as well as the particular manufacturing process employed (presence of a size classifying system or not, screening or milling system). Milk of lime made from hydrated lime will have a particle size distribution similar to that of the hydrate from which it is produced and the solids content can vary from 5 to 20 w %.

Milk of lime made from quicklime, in a commercial, continuous process, is typically produced by common paste, detention, or ball mill slakers (Boyton, 1980). In all cases, quicklime is added to an excess amount of water and mixed together, to produce slurry with a solid content ranging from 5 to 30 w %. The water reacts with the quicklime particles during the slaking operation in an exothermic reaction to form slaked lime. During the slaking of quicklime with an excess of water, the temperature of hydration is below 100° C. (212° F.). The particle size distribution of the milk of lime is a function of both the nature of the quicklime and the coarse fraction removal systems, which include screening, settling and milling.

Lime slurries can be made either in batches or in a continuous process.

It is generally economically advantageous to be able to increase the solid content of the milk of lime, in order to reduce the transportation costs and the size of the equipment (storage reservoirs, pumps etc.).

The economics of transporting 5-30 w % solid content milk of lime is poor as it requires large storage tanks, pumps and equipment. This accounts for the fact that most milk of lime slakers are located where the milk of lime is being used. The challenges with higher solid content milks of lime, which could be made off-site and transported, is that they become progressively thicker the more solids they contain and are difficult to pump and to use. The thinness or thickness of the milk of lime is referred to as viscosity. By the term viscosity, it is meant in the present application, dynamic or absolute viscosity measured in the centipoise (cP) unit or in the millipascal-second (mPa·s) unit. One centipoise is equal to one millipascal-second (mPa·s) in the International system of Units. With regard to milk of lime applications, experience has made it possible to establish that it is desirable not to exceed a viscosity of about 1500 mPa·s, in some industrial applications, preferably not to exceed about 400 mPa·s.

In addition to solid content, viscosity is also controlled by particle size. An aqueous suspension with the same solid content but with different particle size distribution will have different viscosity value. The finer the particle size, the higher the viscosity.

Particle size of milk of lime is an important characteristic in considering the relative neutralization or flocculation capacity in waste water treatment. This is referred to as reactivity of a milk of lime which can notably be measured by conductivity measurement of a solution made by diluting a small amount of said milk of lime in a large volume of demineralized water. This technique is disclosed in the European standard EN 12485. It is known that the dissolution rate of the particles of lime in demineralized water is more rapid when the particle size is smaller. In other words, the reactivity of the milk of lime is usually higher when its constitutive particles are smaller.

Particle size of milk of lime is also an important characteristic in considering the settling rate or sedimentation rate of the solid phase of the suspension. The coarser the particles the faster the milk of lime will settle and the faster it settles the more probably intermittent or continuous mixing will be required to maintain a consistent solid content. Settling or sedimentation can also generate a hard-packed sediment that is not easily suspended even with vigorous agitation.

It is well appreciated by those skilled in the relevant art that it is sometimes a difficult task to reconcile properties of high solids content, low viscosity and fine particle size in a milk of lime. A number of technologies have been employed in the past.

For example, it is known how to increase the solids content of the milk of lime by adding a dispersing agent, in the presence of a small quantity of an alkaline metal hydroxide (U.S. Pat. Nos. 5,616,283, 4,849,128, and 4,610,801). This method of preparation makes it possible to achieve concentrations of dry matter greater than 40 w % based on the total weight of the milk of lime, with a viscosity less than 1200 mPa·s. However, the use of dispersing agents does not change the particle size of the milk of lime and therefore its reactivity, adds to the cost of the operation and is incompatible with certain applications.

It is also known how to increase the solids content in the suspension, while limiting the increase in viscosity, by incorporating hydrated lime having a coarser particle size or by slaking quicklime under conditions favorable to the growth of the grains; for example, by limiting the increase in temperature during slaking, by adding additives such as sulfates etc. (U.S. Pat. No. 4,464,353). Such milks of lime are less reactive, which limits the uses thereof.

Fine milk of lime with high solids content, relatively low viscosity and high reactivity is particularly preferred in some industrial applications, for example, in industrial water treatment applications. Existing production technologies for producing milks of lime may or may not meet the requirements for such specialized applications. Some of the known commercial technologies for producing lime slurries include the following:

The commercial product "Neutralac™ SLS45" is a 45 w % solids slurry, with a viscosity of less than 600 mPa·s and a particle size distribution with the following value $d_{50}$ of 2.5-3.5 μm and $d_{100}$ of less than 90 μm.

Equipment and processes as notably disclosed in US patent U.S. Pat. No. 5,507,572 are another common approach to milk of lime production. Quicklime is added to water in a batch tank which is equipped with horizontal paddles for mixing. The resulting milks of lime have a particle size distribution, $d_{50}$ value, of around 10 to 20 μm. Gypsum may be added to increase the particle size in order to reduce the initial viscosity of the milk of lime. The solid content achieved is generally in the range of 30-40 w %. While this type of process can be used to produce a milk of lime from quicklime which is excellent for soil stabilization type applications, the coarse nature of the slurry and the addition of gypsum generally make it unsuitable for water treatment and other particularly specialized type applications.

Therefore, one limitation of milks of lime made from quicklime is that typically, such slurries have a coarse fraction that is unsuitable for pumping and that reduces the milk of lime reactivity.

Variables that affect the quality of slaked lime are disclosed in J. A. H. Oates—"Lime and limestone" (pages 229-248) as well as in Boynton—"Chemistry and technology of lime and limestone" (pages 328-337).

Some routes were developed in the prior art in order to produce fine milk of lime from quicklime. One of them uses highly reactive quicklime which already presents a small particle size and which produces, during the slaking reaction, small particles of slaked lime.

By consequence, such alternative is unfortunately limited to the use of particular types of quicklime as starting material.

Indeed, during common process of milk of slaked lime production, it is known that depending on the temperature rise reactivity of the starting quicklime, different qualities of slurries may be reached.

Quicklime temperature rise reactivity also called in short herein after quicklime reactivity can be measured according to European Standard EN 459-2 or to the American Standard ASTM C110.

In the American Standard ASTM C110, the quicklime reactivity is defined by the temperature rise generated in 30 seconds when adding 100 g of quicklime into 400 ml of water at 25° C. (usually called ΔT30).

In the European Standard EN 459-2, the quicklime reactivity is defined by the $t_{60}$ temperature rise, which corresponds to the time needed to bring 600 ml of water from 20° C. to 60° C., adding 150 g of ground quicklime (0-1 mm).

Similarly, we can define a $t_{30}$ value, which corresponds to the time needed to bring 600 ml of water from 20° C. to 30° C., adding 150 g of ground quicklime (0-1 mm).

Typically, slow reactive quicklime (with a $t_{60}$ between 3 min and 20 min) dissolves and hydrates more slowly thereby producing a coarser milk of lime. By opposition, highly reactive quicklime (with a $t_{60}$ lower than 2.5 min, preferably lower than 1 min) produces finer milk of lime.

Others approaches for producing fine milks of lime from quicklime involve some actions such as increasing the temperature during the slaking reaction, for example by using water at a higher temperature. The mixing condition of the formed slurry is another factor which has an impact on the size of the particles of the slaked lime in the formed milk of lime. Additives can also be added in the slaking water or in the milk of lime directly in order to reduce the size of the slaked lime particles in the milk of lime. Despite the established drawbacks, such approaches also have the disadvantage to lead to re-agglomeration phenomena as explained in page 230 of "Lime and limestone"—J. A. H. Oates.

Of course, a milk of lime can also be wet milled in order to reduce the size of the particles; however, such approach requires an additional energy consuming step complex to implement.

Unfortunately, all the existing alternatives for producing fine milks of lime from quicklime present drawbacks such as a restriction on the type of quicklime that can be used, the undesired presence of agglomerates, a large number of distinct process steps, the presence of additives such as nitrates which are not desirable or the use of high energy consuming and complex devices such as grinding devices which notably induce loss in productivity.

Therefore, presently, there is still a need for a reliable and easy way to produce a milk of lime of great fineness while avoiding the aforementioned drawbacks of the prior arts, notably restrictive dependency on properties of the starting material, presence of required additives, large amount of distinct process steps, use of complex devices or where the energy consumption or the costs to achieve the desired fineness is a constraint for reaching a certain quality of the milk of lime.

To solve this problem, the present invention provides a process for manufacturing a milk of lime of great fineness as aforementioned by using a specific manufacturing process of a milk of slaked lime of great fineness.

The process for manufacturing a milk of lime of great fineness according to the invention comprises at least the steps of
  a) Providing one lime compound chosen in the group consisting of prehydrated lime, a paste of lime obtained by addition of water to quicklime instead of addition of quicklime to water and their mixture, and
  b) Forming a milk of slaked lime of great fineness with said lime compound.

According to the present invention it has been found that by starting with a specific selection of starting material chosen in the group of prehydrated lime and a paste of lime obtained by addition of water to quicklime instead of addition of quicklime to water, a milk of slaked lime of great fineness can be obtained.

The milk of slaked lime obtained according to the invention presents therefore a high reactivity, due to its great fineness, not necessarily linked to the reactivity of the quicklime initially used. This was unexpected since fine milks of lime made from quicklime were up to now substantially obtained by slaking highly reactive quicklimes.

Indeed, it has been found that the selection of a specific lime compound chosen in the group consisting of prehydrated lime or a paste of lime obtained by addition of water to quicklime instead of addition of quicklime to water shares the concept that milk of slaked lime of great fineness is obtained due to the existence of prehydrated lime compounds.

If the milk of slaked lime of great fineness is formed from prehydrated lime, the particles of prehydrated lime introduced during the step of forming the milk of slaked lime are prehydrated particles and are further slaked with a predetermined volume of water for forming the milk of slaked lime. In this latter case, the volume of water can be added to the prehydrated lime particles or in the contrary, prehydrated lime can be added to the volume of water.

If the milk of slaked lime of great fineness is formed from a paste of lime obtained by addition of water to quicklime instead of addition of quicklime to water, prehydrated lime is formed as intermediate product during the addition of water, which intermediate product progressively disappears more or less along water addition until the paste of lime is formed.

The paste of lime thereby obtained already shows very fine particles since a high temperature is obtained during water addition to form the paste of lime.

The paste of lime is then further diluted for forming said milk of slaked lime of great fineness either by addition of water to the paste of lime or by addition of the paste of lime to water.

If the lime compound is a prehydrated lime, this might be one commercially existing prehydrated lime or a freshly made prehydrated lime. It has been shown that when starting with a prehydrated lime, beside the fact that a milk of slaked lime of great fineness is achieved, the milk of slaked lime of great fineness can be reached without requiring a very high grade of quicklime used for forming the prehydrated lime. Accordingly, a milk of lime of great fineness can be made from a broad range of starting quicklimes as long as when forming the prehydrated lime, the conditions during the partial hydration are controlled in order to form a prehydrated lime with an homogeneous water uptake.

Prehydrated lime is made by particles which are made of a core of quicklime (CaO) and a coating of hydrated lime $Ca(OH)_2$ which is forming a temporarily protective layer or film covering the CaO core. Such prehydrated lime has been inter alia disclosed in EP 1 154 958 and FR 2 841 895.

According to the prior art, the presence of the hydrated lime coating around the quicklime core is especially useful for delaying slaking reaction of the CaO core of the particles, for example in sludge or water treatment. As already mentioned, quicklime, when in contact with water or an aqueous phase undergoes an explosive slaking reaction, being very fast and exothermic. The protective layer or film made of hydrated lime delays the contact between the aqueous phase and the quicklime forming the core of the particle.

The use of prehydrated lime to form a suspension is known for example from document FR 2 895909. According to this document, quicklime which has been prehydrated is used to produce a suspension of lime with the aim to have the slaking reaction occurring on a surface to be treated for disinfection or deodorization purposes. Use is therefore made of prehydrated lime particles with a delay in temperature rise reactivity of at least 5 minutes, preferably 20 minutes and more particularly about 60 minutes. This delay is intended to allow the user to project the suspension of lime on the surface to treat before the slaking reaction occurs, thereby allowing the energy of said slaking reaction in terms of heat generation for disinfection or deodorization to occur on said surface to be treated. A milk of slaked lime in the meaning of the invention is however never disclosed, since the present invention is able to provide a milk of slaked lime with particles of great fineness.

In the process according to the present invention, when a prehydrated lime is used to form the milk of lime of great fineness, the prehydrated lime which presents a decreased/delayed temperature rise reactivity allows for CaO present therein to react with water after a certain lag time. One way to measure such lag time is by the $t_{30}$ reactivity value of said prehydrated lime, as illustrated in "FIG. 1". It was found that despite its delayed/slow temperature rise reactivity, prehydrated quicklime results in milk of lime with a fineness greater than the one that would have been obtained in similar wet slaking condition with the original quicklime.

As it can be understood from the aforementioned, the process of manufacturing a milk of lime of great fineness according to the present invention is particularly useful in that a milk of slaked lime of great fineness is easily obtained at competitive costs since either not necessarily requiring high energy consumption steps like milling or not requiring very reactive quicklime while using mainly conventional equipment.

The milk of lime of great fineness has been advantageously obtained by providing a specific selection of a lime compound chosen in the group consisting of prehydrated lime and a paste of lime obtained by addition of water to quicklime instead of addition of quicklime to water and their mixture to a step of forming a milk of slaked lime of great fineness either by a subsequent slaking step or by a subsequent dilution step.

In a preferred embodiment of the process according to the present invention, said paste of lime is obtained by progressive addition of water to quicklime under agitation condition.

Indeed, in this case, the addition of water to lime can be made progressively under agitation. This yields to the fact that during the progressive addition of water, a first intermediate compound is formed being prehydrated lime which progressively disappears with completion of the progressive addition of water. This progressive addition of water allows to reach a high temperature during the hydration step forming very small particles.

According to this preferred embodiment, said progressive addition of water to quicklime is presenting a pattern of addition of water for controlling water taken up by the quicklime when forming the paste of lime.

By the terms pattern of addition of water, it is meant according to the present invention that the water addition should be controlled with respect to, for instance, its flow rate, the duration of the water addition or even the distance along which water is added to lime if the paste of lime is made in a continuous step.

If the step of forming the paste of lime concerned by the present invention is a batch process, the key factor will be the amount of water taken up by a predetermined amount of lime, optionally containing additives and for the spreading of the water upon/within the quicklime in the batch process and/or the agitation parameters.

In another particular embodiment of the process according to the present invention, said progressive addition to form the paste of lime is a continuous process during which progressive hydration of quicklime is performed by adjusting quicklime feeding rate into a hydrator wherein a predetermined atmosphere is fed containing a limited amount of water for addition of water to quicklime.

Indeed, if the step of forming the paste of lime is a continuous process, the quicklime is transported within a hydrator or hydrator-like vessel and therefore has a residence time. To control the taking up of water, by quicklime, one can act on the flow rate of water, taking into account the speed of lime introduction during the transport into the hydrator or hydrator-like vessel, the size of at least water droplets and/or the distance along which water is added.

In a particular embodiment, said progressive addition to form the paste of lime is performed by spraying a mist of water into a hydrator.

Preferably, said mist of water is a controlled size of droplets of addition of water. The size of the water droplets also allows the control of the hydration reaction for forming the paste of lime and therefore the quality of the resulting lime compound provided to the step of the process of forming the milk of slaked lime of great fineness. Indeed, the size of the water droplets may prove of relevant impact since those latter should have a size big enough to not be evaporated before reaching the quicklime and allowing the hydration reaction to occur but at the same time not too big to avoid local non homogeneous hydration of particles which would undesirably lead to non-homogeneous lime compound.

In a preferred embodiment of the process according to the present invention, the water added to form said paste of lime comprises an additive chosen in the group consisting of carbohydrates, sugars, alcohol sugars, in particular sorbitol, carbon dioxide, phosphates, sulfates, bicarbonates, silicates, phosphonates, polyacrylates, polycarboxylic acids, low molecular weight organic acids, mixtures and derivatives thereof.

In a variant of the process according to the present invention, the milk of lime of great fineness is obtained from prehydrated lime obtained by a partial hydration of quicklime under required controlled conditions in order to reach prehydrated lime with homogeneous water uptake. The required controlled conditions allow for control of the degree of hydration (water uptake of the prehydrated lime) but also the temperature rise reactivity towards water of the resulting prehydrated lime particles for the further slaking step.

The hydration of quicklime is governed by the molecular reaction (I).

$$CaO+H_2O \rightarrow Ca(OH)_2 \quad (I)$$

This reaction is influenced by the temperature rise reactivity $t_{60}$ of the quicklime, the speed of agitation of the lime undergoing the hydration process, the size of the particles since the molecules in the core of the particles are less accessible to water, the temperature, the condition of addition of water (continuous, in batch, amount of water, flow rate, pattern of addition, duration of addition, size of droplets during addition of water).

The required controlled conditions according to the variant of the process are the following:
 a) Temperature rise reactivity of quicklime
 b) Agitation conditions
 c) Total amount of water added to quicklime
 d) Particle size of quicklime In the process according to the present invention, when a prehydrated lime is used to form the milk of lime of great fineness, the temperature rise reactivity $t_{60}$ of quicklime shall be higher than 1 min.

In the same variant of the process, it has been shown also very important to control the agitation condition of the partial hydration step to produce a coating as more regular as possible (identical thickness covering the quicklime particles). Agitation can be accomplished, but is not limited to, by a screw system within a hydrator or hydrator-lime vessel, or auger type mixer, paddle type mixer or pin mixer. It is thought that such regular coating onto quicklime cores of the prehydrated lime particles allows to reach a prehydrated lime showing homogeneous to reactivity meaning that each individual particles of prehydrated lime shows the same $t_{30}$ value. The $t_{30}$ reactivity of the prehydrated lime provided to the slaking step is generally increased compared to the quicklime initially used, leading to a delay of the slaking reaction which is enough to ensure dispersion of prehydrated lime particles which on its turn accelerates kinetic of solubility and therefore fineness while reducing together the risk of local overheating, boiling points leading to agglomerates.

Further, the total amount of water added to quicklime to produce the prehydrated lime for forming the milk of lime of great fineness should be also controlled in such a way that the total amount of water is sub-stoichiometric and limited to reach at most a water uptake of 16 weight % with respect to prehydrated lime to control the maximum temperature rise and dust generation during partial hydration.

The amount of water used for obtaining the prehydrated lime allows for a control of the temperature which limits the heat generated during manufacturing the prehydrated lime.

During the step of forming the prehydrated lime, the addition of the amount of water may be a progressive addition of water to lime presenting a pattern of addition of water as explained more in details herein after for controlling water uptaking by the quicklime when forming the prehydrated lime.

In the process according to the present invention, when a prehydrated lime is used to form the milk of lime of great fineness, particle size of the quicklime used shall presents a $d_{100}$ of at most 2 mm.

By the terms pattern of addition of water, it is meant according to the present invention that the water addition should be controlled with respect to, for instance, its flow rate, the duration of the water addition or even the distance along which water is added to lime if the prehydrated lime is made in a continuous step.

If the step of forming the prehydrated lime is a batch process, the key factor will be the amount of water taken up by a predetermined amount of lime, optionally containing additives and/or the spreading of the water upon/within the quicklime in the batch process and/or the agitation parameters.

In a particular embodiment of the process according to the present invention for producing milk of lime of great fineness from prehydrated lime, said progressive addition to form the prehydrated lime is a continuous process during which progressive hydration of quicklime is performed by adjusting quicklime feeding rate into a hydrator wherein a predetermined atmosphere is fed containing a limited amount of water for addition of water to quicklime.

Indeed, if the step of forming the prehydrated lime is a continuous process, the quicklime is transported within a hydrator or hydrator-like vessel and therefore has a residence time. To control the taking up of water by quicklime, one can act on the flow rate of water, taking into account the speed of lime introduction during the transport into the hydrator or hydrator-like vessel, the size of water droplets and/or the distance along which water is added.

In particular, the progressive addition to form the prehydrated lime is performed by spraying a mist of water into a hydrator under sub-stoichiometric conditions compared to quicklime.

Preferably, said mist of water is a controlled size of droplets of addition of water. The size of the water droplets also allows the control of the partial hydration reaction and therefore the quality of the resulting prehydrated lime provided to the slaking step of the process. Indeed, the size of the water droplets may prove relevant impact since those latter should have a size big enough to not be evaporated before reaching the quicklime and allowing the partial hydration reaction to occur but at the same time not too big to avoid local non-homogeneous hydration of particles which would undesirably lead to non-homogeneous prehydrated lime resulting in an uneven coating.

In a preferred embodiment of the process according to the present invention, the prehydrated lime is obtained by a partial hydration of quicklime in the presence of an additive chosen in the group consisting of carbohydrates, sugars, alcohol sugars, carbon dioxide, phosphates, sulfates, bicarbonates, silicates, phosphonates, polyacrylates, polycarboxylic acids, low molecular weight organic acids, mixtures and derivates thereof.

According to the present invention, when the milk of slaked lime of great fineness is made from prehydrated lime, said step of forming said milk of slaked lime of great fineness with said lime compound is a slaking step of said prehydrated lime.

According to the present invention, when the milk of slaked lime of great fineness is made from prehydrated lime, said prehydrated lime comprises particles of prehydrated lime and agglomerates of said particles, said process further comprises desagglomeration of the agglomerates of particles during and by the step of slaking of said prehydrated lime when forming said milk of slaked lime of great fineness.

It has been indeed found that prehydrated lime particles agglomerate together and the particle size of the prehydrated quicklime increases due to the hydrate coating of the quicklime particles. This is attributed to the fact that hydrate volume is larger than quicklime due to the pores created by the explosive character of the surface hydration of the quicklime particles. Importantly, the slaked lime particles in the final milk of lime present however a very small particles size. Therefore, the increase of particle size of the prehydrated lime after the slaking step supports the production of finer milk of slaked lime. Moreover, the partial hydration of quicklime might lead to more severe chemical crushing, because of the more intense mechanical stresses during hydration leading to finer particles.

It is believed that the decreased/delayed temperature rise reactivity of the prehydrated lime which allows for CaO present therein to react with water after a certain lag time is exploited during slaking to disperse and wet quicklime of the prehydrated lime. In a further step, when partial solubilisation/weakening of the $Ca(OH)_2$ coating of the prehydrated lime takes place, the core quicklime is exposed more suddenly to water than what would have happened without prehydration.

The hydration reaction that takes place is therefore faster, leading to finer hydrate particles.

Consequently, the $t_{30}$ value of the prehydrated lime, as a batch produced product or in a continuous slaking process, is increased compared to the initial quicklime. This delays the slaking reaction, offering therefore the time necessary to disperse/wet the quicklime particles on one hand and on the other hand, after this delay (to be considered as an homogenization period), a steep temperature rise reactivity curve is obtained. This leads to finer particles.

For both alternatives of the process of manufacturing a milk of slaked lime of great fineness according to the present invention, meaning when the lime compound for forming the milk of slaked lime is either a paste of lime or a prehydrated lime, the step of forming a milk of slaked lime of great fineness with said lime compound is a step of adding water to the lime compound.

In a variant of the process of manufacturing a milk of slaked lime of great fineness according to the present invention, the step of forming a milk of slaked lime of great fineness with said lime compound is a step of adding the lime compound to water.

Notwithstanding the fact that water is added to lime compound or lime compound is added to water, the step of forming the milk of slaked lime of great fineness is either
 a) A slaking step when starting from a lime compound being a prehydrated lime
 b) Merely a dilution step when starting from a lime compound being a paste of lime.

In a preferred embodiment according to the invention, notwithstanding the fact that water is added to lime compound or lime compound is added to water, the step of forming the milk of slaked lime of great fineness is a batch step by addition of a predetermined amount of said lime compound into a predetermined amount of water or by addition of a predetermined amount of water into a predetermined amount of said lime compound to produce said milk of slaked lime of great fineness.

In a preferred variant embodiment according to the invention, notwithstanding the fact that water is added to lime compound or lime compound is added to water, the step of forming the milk of slaked lime of great fineness is a continuous step preceded by a feeding of said lime compound into a vessel provided with an exit of milk of slaked lime of great fineness and containing an aqueous suspension of lime and fed with water and is followed by an exit of said milk of slaked lime of great fineness thereby obtained.

In the process for manufacturing a milk of slaked lime of great fineness according to the present invention, either prehydrated lime or paste of lime as lime compound can be reached by a progressive addition of water to quicklime.

In a specific embodiment of the process according to the present invention, said progressive addition of water is pursued during the step of forming said milk of slaked lime of great fineness until said milk of slaked lime of great fineness is reached.

In another specific embodiment according to the process according to the present invention, said progressive addition of water is pursued by increasing the amount of water addition until said predetermined amount of water of the step of forming said milk of slaked lime of great fineness is added, meaning that for example the flow rate of water addition may be increased while staying continuous or progressive.

In the process according to the invention, when the lime compound provided to the step of forming a milk of slaked lime with great fineness is prehydrated lime, it has been shown advantageous to perform before forming the milk of slaked lime of great fineness a temperature control onto said prehydrated lime.

In the aforementioned variant according to the invention relating to the condition of slaking, it has been found that fine milk of slaked lime with very broad range of concentration can be obtained when slaking prehydrated lime.

This is further advantageous since in the common practice, one way to get finer milk of slaked lime from a defined quicklime is to raise the solid content of milk of lime during slaking as low solid concentration leads to coarser milk of lime. For this reason, typical slaking units often produce milk of lime at its highest feasible concentration. However, milk of lime concentration is limited by temperature. High temperature leads to dust handling problems during slaking and to less pronounced homogenization leading to overheated points and therefore to re-agglomeration, explaining why the temperature shall be preferably controlled before the slaking step for forming the milk of slaked lime of great fineness from prehydrated lime.

For these practical reasons, the concentration of typical industrially produced milk of slaked lime is often close to 20 w % based on the total weight of the slurry, and when a lower concentration is desired, it is a common practice then to dilute such milk of slaked lime to the concentration needed for the application.

According to the present invention, it has been shown that the prehydration step releases end users from stretching the process at maximum feasible concentration while trying to get finest milk of slaked lime as possible. Indeed, according to the present invention, it is possible to produce a fine milk of slaked lime from 5 w % to 55 w % solid concentration with respect to the total weight of the milk of lime.

Depending of the partial hydration level in the process according to the invention, part of the heat generated during wet slaking has already been removed during the prehydration step. As a consequence, solid content of the milk of lime can be raised.

In a particularly preferred embodiment according to the invention, said prehydrated lime comprises a quicklime content comprised between 40 and 96 w % with respect to said total weight of said prehydrated lime and a hydrated lime content comprised between 60 and 4 w % with respect to said total weight of said prehydrated lime.

Other embodiments of the process according to the present invention are mentioned in the annexed claims.

The present invention also relates to a milk of slaked lime of great fineness comprising slaked lime particles in suspension into an aqueous phase, wherein the slaked lime particles presents a $d_{50}$ greater than or equal to 2 μm, in particular greater than or equal 2.5 μm, and lower than or equal to 6 μm, in particular lower than or equal to 5.5 μm.

The notation $d_x$ represents a diameter, expressed in μm, relative to which X % of the particles or grains measured are smaller.

The milk of slaked lime of great fineness according to the present invention is therefore a milk of lime wherein not only $d_{50}$ is reduced compared to conventional milk of lime of great fineness but also the presence of coarse fraction agglomerates is avoided. Those latters might be present in the prehydrated lime initially provided but disappear during the slaking step forming the milk of slaked lime or, when starting with a paste of lime, are removed by simple screening step, thereby avoiding the use of grinding step typically required according to the prior art.

The milk of lime according to the invention therefore can be used in multiple applications, such as in waste water and sludge treatment, but as well as in flue gas treatment requesting high performance such as fineness and consequently highly reactive milk of lime.

The milk of slaked lime according to the present invention allows therefore to get higher performance at lower cost with respect to common industrial milk of lime manufacturing process since for example, a conveying screw located where prehydrated lime is produced according to the invention may give same results in terms of milk of lime performance as wet milling the common milks of lime, this latter process step being energy consuming and complex to implement.

Advantageously, in the milk of slaked lime according to the present invention, said aqueous phase comprises an additive chosen in the group consisting of carbohydrates, sugars, alcohol sugars, in particular sorbitol, carbon dioxide, phosphates, sulfates, bicarbonates, silicates, phosphonates, polyacrylates, polycarboxylic acids, low molecular weight organic acids, mixtures and derivatives thereof.

In a preferred embodiment according to the present invention the milk of slaked lime presents a slaked lime particle content greater than 25 w %, preferably greater than 30 w %, more preferably greater than 35 w %, and most preferably greater than 40 w %, with respect to the total weight of the milk of lime, said slaked lime particle content being lower than or equal to 55 w %, preferably lower than or equal to 50 w %, in particular lower than or equal to 45 w % with respect to said total weight of the milk of slaked lime.

In a preferred embodiment according to the present invention, stabilizing additives/viscosity reducer/viscosity stabilizer can be added to adjust the viscosity of the milk of slaked lime.

Preferably, the milk of slaked lime according the present invention has a viscosity lower than 1500 mPa·s, preferably lower than 1200 mPa·s, in particular lower than 1000 mPa·s, particularly lower than 900 mPa·s, more particularly lower than 800 mPa·s, even lower than 600 mPa·s, particularly lower than 450 mPa·s and more preferably lower than 300 mPa·s.

In the context of the present invention, the wording viscosity was used to designate dynamic or absolute viscosity. Dynamic viscosity or absolute viscosity designate viscosity that is either measured in the centipoise (cP) or in the millipascal-second (mPa·s) units.

In a particularly advantageous embodiment according to the present invention, the milk of slaked lime of great fineness present a settling rate comprised between about 1 and 2 vol. % after 24 hours as measured according to ASTM C110-11.14.

Other embodiments of the milk of slaked lime according to the present invention are mentioned in the annexed claims.

Other characteristics, details and advantages of the present invention are explained in the following description, given hereunder, by making reference to the drawings and examples, while not being limited thereto.

Figure 1:
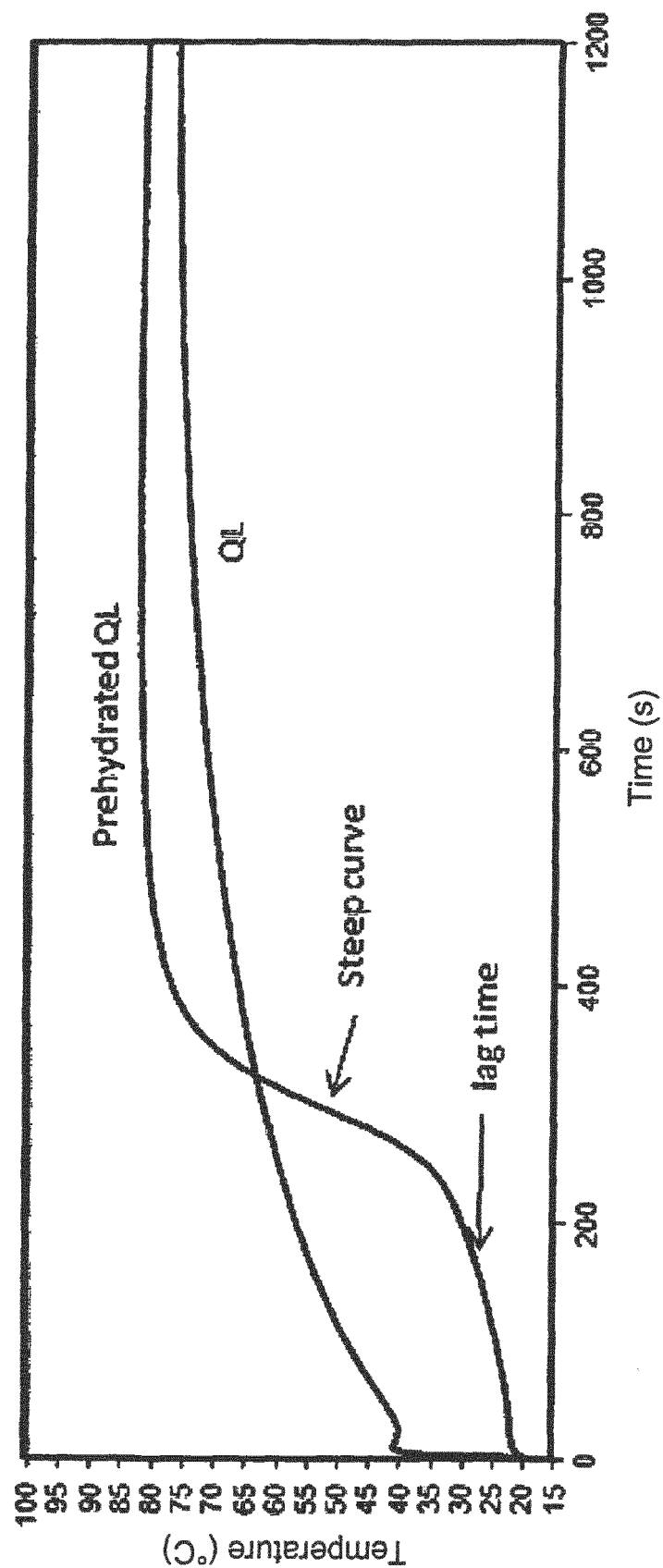
FIG. 1 shows the lag time and the to temperature rise reactivity value of a prehydrated lime compared to initial quicklime.

The present invention relates to a process for manufacturing a milk of slaked lime of great fineness comprising a step of providing a lime compound chosen in the group consisting of prehydrated lime or a paste of lime obtained by the addition of water to quicklime to a step of forming a milk of slaked lime of great fineness by adding water to lime compound or lime compound to water.

As briefly discussed in the Background section, the term "lime" can encompass quicklime (calcium oxide—CaO), hydrated lime (calcium hydroxide—$Ca(OH)_2$) or milk of lime. Quicklime is manufactured by chemically converting limestone (calcium carbonate—$CaCO_3$) into calcium oxide in a high temperature kiln. Hydrated lime is created when quicklime chemically reacts with water and is generally in a powdered form.

Milk of slaked lime is a suspension of hydrated lime in water and can be formed from either hydrated lime or quicklime; however, preferred milk of slaked lime used herein is produced from prehydrated quicklime or paste of lime obtained by the addition of water to lime rather than lime to water. The quicklime used for the purposes discussed herein may be "high calcium" lime, which contains no more than about 5 percent magnesium oxide or hydroxide.

The preferred milk of slaked lime used herein will contain about 20-55% by weight of solids, preferably about 40-50% by weight of solids, and most preferably about 45% by weight of solids, based upon the total weight of the milk of slaked lime.

This invention's goal is to produce milk of slaked lime with fine particle size distribution. This property is achieved by the batch or continuous process according to the invention comprising a first step of providing a lime compound chosen in the restricted group consisting of prehydrated lime and a paste of lime obtained by the addition of water to quicklime, followed by a step of forming said milk of slaked lime of great fineness which in its preferred form presents a particle size distribution $d_{50}$ comprised between 2-5 μm or even between 2.5-3.5 μm, showing a slaked lime content of 42-45% by weight of solids.

In the discussion which follows, the particle sizes distributions (also called granulometries) are measured by means of a laser granulometer in methanol; these distributions are characterized in terms of, for example, $d_{50}$, $d_{90}$ and $d_{98}$, interpolated values of the particle size distribution curves. The dimensions $d_{50}$, $d_{90}$ and $d_{98}$ correspond to the dimensions for which respectively 50%, 90% and 98% of the particles are less than a given value.

The viscosity of these milks of lime is measured according to standard industry practice, as by the use of a "Brookfield DV III Rheometer" viscometer, with spindle N° 3 at 100 rpm. The measurement was taken on the 30th second, once the viscometer motor was turned on.

The milk of slaked lime of great fineness according to the present invention can be obtained either from prehydrated lime or from a paste of lime obtained by addition of water to quicklime instead of addition of quicklime to water.

Indeed, it has been found that the selection of specific lime compound chosen in the group consisting of prehydrated lime or a paste of lime obtained by addition of water to quicklime instead of addition of quicklime to water shares the concept that milk of slaked lime of great fineness is obtained due to the existence of prehydrated lime compounds.

If the milk of slaked lime of great fineness is formed from prehydrated lime, the particles of prehydrated lime introduced during the step of forming the milk of slaked lime are prehydrated particles and are further slaked with a predetermined volume of water for forming the milk of slaked lime. In this latter case, the volume of water can be added to the prehydrated lime particles or in the contrary, prehydrated lime can be added to the volume of water.

If the milk of slaked lime of great fineness is formed from a paste of lime obtained by addition of water to quicklime instead of addition of quicklime to water, prehydrated lime is formed as intermediate product during the addition of water, which intermediate product progressively disappears more or less along water addition until the paste of lime is formed.

First Preferred Way for Embodying the Invention: Forming a Milk of Slaked Lime of Great Fineness from Prehydrated Lime.

In one embodiment according to the present invention, the milk of slaked lime of great fineness is obtained from prehydrated lime which may be freshly produced or commercially available. The prehydrated lime is then fed to the step of forming the milk of slaked lime of great fineness for adding water to the prehydrated lime or prehydrated lime to water. In both cases, the step of forming the milk of slaked lime of great fineness is a slaking step which may be a batch step or a continuous or progressive step.

This alternatives show, besides the advantageous high reactivity of the resulting milk of lime due to its great fineness, another advantageous effect residing in the fact that the process according to the present invention also allows, when needed, to flatten existing quality variations whether they are due to quicklime parameter variations or to slaking conditions. The process according to the present invention therefore allows also to upgrade milk of lime qualities from a given quicklime by forming a coating on prehydrated lime particles which renders the quicklime suitable for applications where finer milk of slaked lime is needed.

In this preferred embodiment of the process according to the invention, if the amount of water added to quicklime during partial hydration step is low (≤4-8 w % of Ca(OH)$_2$ with respect to prehydrated lime), the partial hydration step can be done in an existing equipment such as a screw conveying the quicklime to storage tank.

Otherwise, prehydration step is done in an appropriate equipment such as an hydrator, hydrator-like vessel, blugers, or pug-mill.

In a preferred embodiment of prehydration, when a control of the temperature is performed as controlled condition, in particular when such control is done by limiting, during or after the manufacturing of prehydrated lime, the heat generated by such process step, a cooling can be done within the screw of the hydrator or separately after the partial hydration step in a paddle cooler.

In this case, the prehydrated lime is added into the front of the hydrator. The trough is oriented at a small angle of inclination. The paddles do not have a transport function; they are designed for maximum heat transfer, in this case for cooling without requiring introduction of cooling air. This equipment as well as the embodiment of the process according to the invention has shown to be optimized since due to the slowly-turning paddle shaft, the dust generation is limited. The temperature control by cooling down the prehydrated lime before slaking allows avoiding formation of agglomerates.

It has to be understood that in this preferred embodiment of the process according to the invention, the prehydration step has to be carefully controlled so that quicklime will effectively be coated by a regular layer of hydrated lime around the quicklime core. In a variant of the process according to the present invention, the prehydrated lime can be obtained by submitting quicklime under gas containing steam, eventually CO$_2$ at various temperatures in order to better control the thickness of the coating by agitating quicklime in a stream of gas.

The coating of the quicklime core is not restricted to Ca(OH)$_2$ eventually comprising further CaCO$_3$ but to any kind of chemicals that would delay temperature rise reactivity and show steeper temperature rise reactivity curve after a lag period, such as soluble phosphates, sulfates, bicarbonates, silicates or organic molecules adsorbed on lime particles such as sugars, phosphonates, polyacrylates, polycarboxylic acids, low molecular weight organic acids.

The prehydrated lime may be obtained by a partial hydration step which is pursued continuously until the milk of slaked lime is produced, with the addition of at least water (water with or without additives) pursued under the same condition or increased in terms of flow rate. In this embodiment of the present invention, the fine particle size distribution and high percent solids properties of the milk of slaked lime are achieved by slaking quicklime to, for example, a 45 w % solids slurry, by utilizing a continuous hydration process, with water being added continuously in a controlled manner to the quicklime, rather than adding quicklime to a body of water in a vessel or container and agitating the mixture, as was done in the batch processes of the past.

Alternatively, the prehydrated lime may be obtained by a continuous process where a fine spray mist of at least water can be provided initially, which step is followed by a stage in which at least water is added as a steady flow of water. However, in the preferred form of the invention, there is an initial stage which comprises a continuous controlled spray of a fine mist of at least water which is achieved, for example, with a full cone spray nozzle. A viscosity reducer or viscosity stabilizer can also be utilized. The controlled addition of at least water within the scope of the present invention can be achieved by utilizing a fine spray mist of at least water onto the quicklime or even on prehydrated lime.

In alternative embodiment according to the present invention, prehydrated lime may be obtained by a steady addition of water on quicklime in a hydrator under high agitation conditions. The prehydrated lime thereby obtained is then fed to a slaking step into which water is added to prehydrated lime or prehydrated lime is added to water in a batch or continuous step to form the milk of lime of great fineness.

Second Preferred Way for Embodying the Invention: Forming a Milk of Slaked Lime of Great Fineness from a Paste of Lime.

According to this preferred embodiment, a paste of lime is obtained from quicklime before being diluted with water to form the milk of slaked lime of great fineness.

For forming the paste of lime, water is added to quicklime in a progressive way, preferably in the form of a mist of at least water (with or without additives) in order to reach a high hydration temperature for reaching fine particles of lime. During this progressive hydration, prehydrated lime is formed as an intermediate product and undergoes hydration until a paste of lime is reached by pursuing the hydration process. The addition of water is controlled in such a way that lime is progressively hydrated and does not undergo directly full slaking, but merely with a ratio of hydration increasing along water addition and therefore along time. This may be done in a continuous process or in a batch process. In both case, the hydration is controlled to reach a progressive hydration of the quicklime. This is done by opposition of lime added to water yielding to full slaked lime particles and sometimes to a non homogeneous mixture of slaked lime and quicklime if no water remains for the further quicklime added.

The paste of lime thereby obtained is further used to form the milk of slaked lime particles by adding water to the paste of lime or the paste of lime to water.

In one embodiment, the paste of lime is obtained by a controlled hydration step which is pursued continuously until a milk of lime is produced, with the addition of at least water (water with or without additives) pursued under the same condition or increased in terms of flow rate. In this embodiment of the present invention, the fine particle size distribution and high percent solids properties of the milk of slaked lime are achieved by slaking quicklime to, for example, a 45 w % solids slurry, by utilizing a continuous hydration process, with water being added continuously in a controlled manner to the quicklime, rather than adding quicklime to a body of water in a vessel or container and agitating the mixture, as was done in the batch processes of the past.

Alternatively, the paste of lime may be obtained by a continuous process where a fine spray mist of at least water can be provided initially, which step is followed by a stage in which at least water is added as a steady flow of water. However, in the preferred form of the invention, there is an initial stage which comprises a continuous controlled spray of a fine mist of at least water which is achieved, for example, with a full cone spray nozzle. A viscosity reducer or viscosity stabilizer can also be utilized.

The controlled addition of at least water within the scope of the present invention can be achieved by utilizing a fine spray mist of at least water onto the quicklime.

In alternative embodiment according to the present invention, a paste of lime may be obtained by a steady addition of water on quicklime in a hydrator under high agitation conditions. The paste of lime thereby obtained is then fed to a dilution step into which water is added to paste of lime or the paste of lime is added to water in a batch or continuous step to form the milk of lime of great fineness.

Thus, in its most preferred form of this embodiment of the present invention, the new process is a continuous or progressive process in which quicklime is slaked, by exposing the quicklime to a fine mist of at least water in a continuous or progressive process. Particle size and viscosity of the slurry are best controlled if the water which is used for the misting operation also contains sugar or a sucrose material, such as, sorbitol, a sugar alcohol. The slaking temperature of the quicklime is preferably monitored, and is preferably maintained in the range from about 200° C. (about 400° F.) to about 350° C. (about 650° F.), before cooling down as water continues to be added to form the final milk of lime of great fineness.

An important aspect of this embodiment is the fact that water is being continuously added to dry quicklime, preferably in the form of a fine mist, forming the paste of lime by passing via a prehydrated lime under controlled conditions; rather than dry quicklime being introduced into a body of water in a mixing tank. Also, there is no necessity for the intermediary steps of producing the final milk of lime of great fineness.

The product which results from the practice of the method of the present invention is a milk of lime which is high in solids, for example 40 to 45 w % solids, which has a particle size, or granulometric dimension, $d_{50}$, in the 2 to-5 micron size range, with a viscosity less than 400 mPa·s, preferably even less than 250 mPa·s, all very desirable characteristics from an industrial viewpoint.

EXAMPLES

Example 1: Impact of the Prehydration on the Prehydrated Lime Granulometry

Three batches of quicklime (crushed to reach $d_{90}$<90 μm) are submitted to a batch prehydration in a conveying screw by spraying 4 w % water (based on the quicklime weight) in order to determine the influence of quicklime prehydration on prehydrated lime granulometry.

The granulometry curves of quicklime and prehydrated quicklime are measured with a laser granulometer Beckman Coulter LS 13320. The results of the granulometry measurements are shown in Table 1.

In the obtained prehydrated lime product, $Ca(OH)_2$ and $CaCO_3$ contents are measured by weight losses at respectively 550° C. (1022° F.) and 950° C. (1742° F.) which are assumed to be water and $CO_2$ respectively. These values are used to calculate the $Ca(OH)_2$ and $CaCO_3$ contents in the prehydrated lime according to the invention. The results are shown in Table 1.

There is almost no evaporation of water during the partial hydration step as almost all added water reacts with the CaO to form $Ca(OH)_2$. The amount of $Ca(OH)_2$ formed in the prehydrated lime is around 17 w %.

As shown in Table 1, prehydrated lime results in coarser particle size distribution compared to the starting quicklime. This is notably explained by an agglomeration of the $Ca(OH)_2$ particles during prehydration.

TABLE 1

|  | Batch no | Granulometry | | | | | | Weight loss at | | $Ca(OH)_2$ % | $CaCO_3$ % |
|  |  | d100 μm | d98 μm | d95 μm | d90 μm | d50 μm | d25 μm | 550° C. % | 950° C. % |  |  |
|---|---|---|---|---|---|---|---|---|---|---|---|
| Quicklime | 1 | 282 | 170 | 144 | 113 | 12.9 | 6.1 | 0.504 | 2.573 | 2.07 | 5.85 |
|  | 2 | 310 | 187 | 158 | 127 | 14.2 | 6.4 | 0.237 | 0.3 | 0.97 | 0.68 |
|  | 3 | 310 | 176 | 150 | 119 | 12.7 | 6.0 | 0.388 | 0.423 | 1.60 | 0.96 |
| Prehydrated lime | 1 | 373 | 193 | 158 | 122 | 20.6 | 10.8 | 4.203 | 2.415 | 17.28 | 5.49 |
|  | 2 | 595 | 210 | 164 | 123 | 18.5 | 9.4 | 4.218 | 0.453 | 17.34 | 1.03 |
|  | 3 | 653 | 201 | 154 | 113 | 20.7 | 11.9 | 3.961 | 0.501 | 16.28 | 1.14 |

Example 2: Forming a Milk of Lime of Great Fineness from Prehydrated Lime in Batch The samples of quicklime and prehydrated lime obtained from Example 1 have been respectively slaked on laboratory scale to obtain a milk of slaked lime with a solid content of slaked lime of 30 w % with respect to the total weight of the milk of lime.

The granulometry of the milk of slaked lime obtained according to the present invention, from prehydrated lime provided under controlled condition, is compared to the granulometry of milk of lime slaked under similar condition, but from quicklime, meaning without prehydration.

Granulometry measurements are made as in Example 1. The dry content of slaked lime in the milk of slaked lime is measured by drying a sample of around 10 g of milk of lime at 150° C. (300° F.) on a thermobalance (accuracy 0.01% dry content) until reaching a constant weight. The results of those measures are given in Table 2.

TABLE 2

|  | Batch no | Granulometry | | | | | | Dry content % |
|  |  | d100 μm | d98 μm | d95 μm | d90 μm | d50 μm | d25 μm |  |
|---|---|---|---|---|---|---|---|---|
| Milk from quicklime (prior art) | 1 | 213 | 86 | 49 | 31 | 9.7 | 5.0 | 30.1 |
|  | 2 | 194 | 79 | 47 | 30 | 8.7 | 4.6 | 30.2 |
|  | 3 | 257 | 140 | 103 | 63 | 13.0 | 6.5 | 30.7 |
| Milk from prehydrated lime | 1 | 53 | 32 | 27 | 21 | 7.1 | 3.9 | 28.4 |
|  | 2 | 53 | 32 | 27 | 20 | 7.0 | 3.9 | 29.0 |
|  | 3 | 101 | 39 | 30 | 24 | 7.3 | 4.0 | 28.9 |

As it can be seen from Table 2, the prehydration of quicklime according to the invention results in a milk of slaked lime in which the $d_{50}$ is reduced from 9-13 μm to about 7 μm and agglomerates of slaked lime particles are nearly absent as the $d_{95}$, $d_{98}$ and $d_{100}$ values are dramatically reduced.

The viscosity of the samples was also measured at 20° C. (68° F.) with a Brookfield DV III Ultra rheometer while using LV mobiles n°61, 62 and 63 turning at 100 rpm over a period of 3 weeks. The viscosity of the milk of slaked lime from the prehydrated quicklime have a higher viscosity value than the milk of slaked lime from fresh quicklime. This is a reflection of particle size reduction.

Mobile n°61 is used for a viscosity up to 60 mPa·s; the mobile n°62 for viscosities between 60 and 300 mPa·s; the mobile n°63 for viscosities up to 1200 mPa·s. The results of the measures are given in table 3 (in mPa·s).

The conductivity reactivity of the so-formed milks of slaked lime was also determined through the measurement of the dissolution kinetic in water of the milk of slaked lime samples, following the teaching the European Standard EN 12485

The following conditions were used. 5 ml of milk of slaked lime diluted to 2 w % dry content were added in 700 g of demineralized water at 25° C. (77° F.) under agitation while continuously measuring the conductivity. The time necessary to reach respectively 63, 90 and 100% of the total conductivity are compared and given in Table 3. The lower are the values of ξ100, ξ90 and ξ63, the more reactive is the milk of slaked lime.

TABLE 3

|  | Batch no | Viscosity after | | | | Solubility Index | | |
|---|---|---|---|---|---|---|---|---|
|  |  | 1 day mPa·s | 1 week mPa·s | 2 weeks mPa·s | 3 weeks mPa·s | Tξ100 s | Tξ90 s | Tξ63 s |
| Milk from quicklime (prior art) | 1 | 105 | 125 | 125 | 120 | 159.0 | 16.5 | 4.0 |
|  | 2 | 130 | 135 | 235 | 235 | 207.0 | 23.0 | 4.5 |
|  | 3 | 80 | 105 | 105 | 115 | 183.0 | 26.5 | 6.0 |
| Milk from prehydrated lime | 1 | 170 | 200 | 205 | 205 | 56.5 | 8.0 | 3.0 |
|  | 2 | 250 | 315 | 315 | 330 | 60.5 | 5.5 | 2.5 |
|  | 3 | 210 | 250 | 280 | 290 | 79.5 | 9.0 | 4.0 |

As it can be seen from Table 3, the following conclusions can be made. The fine granulometry of the slaked lime particles of the milk of slaked lime is reflected in the viscosity and solubility index measurements. Prehydrated lime produces more viscous and more reactive milk of slaked lime due to its increased fineness which can be related to enhanced dissolution kinetic.

The temperature evolution during the slaking reaction of the prehydrated lime for manufacturing milk of slaked lime according to the invention was also monitored and compared to the temperature evolution measured during the slaking reaction of quicklime for manufacturing milk of slaked lime of the prior art. In both cases, the measurements were performed by using the same protocol as the one given into EN 459-2 except that quicklime/water ratio or prehydrated lime/water ratio were adapted to obtain 30 w % of $Ca(OH)_2$ in the resulting milk of lime. The results are given in FIG. 2.

Figure 2:
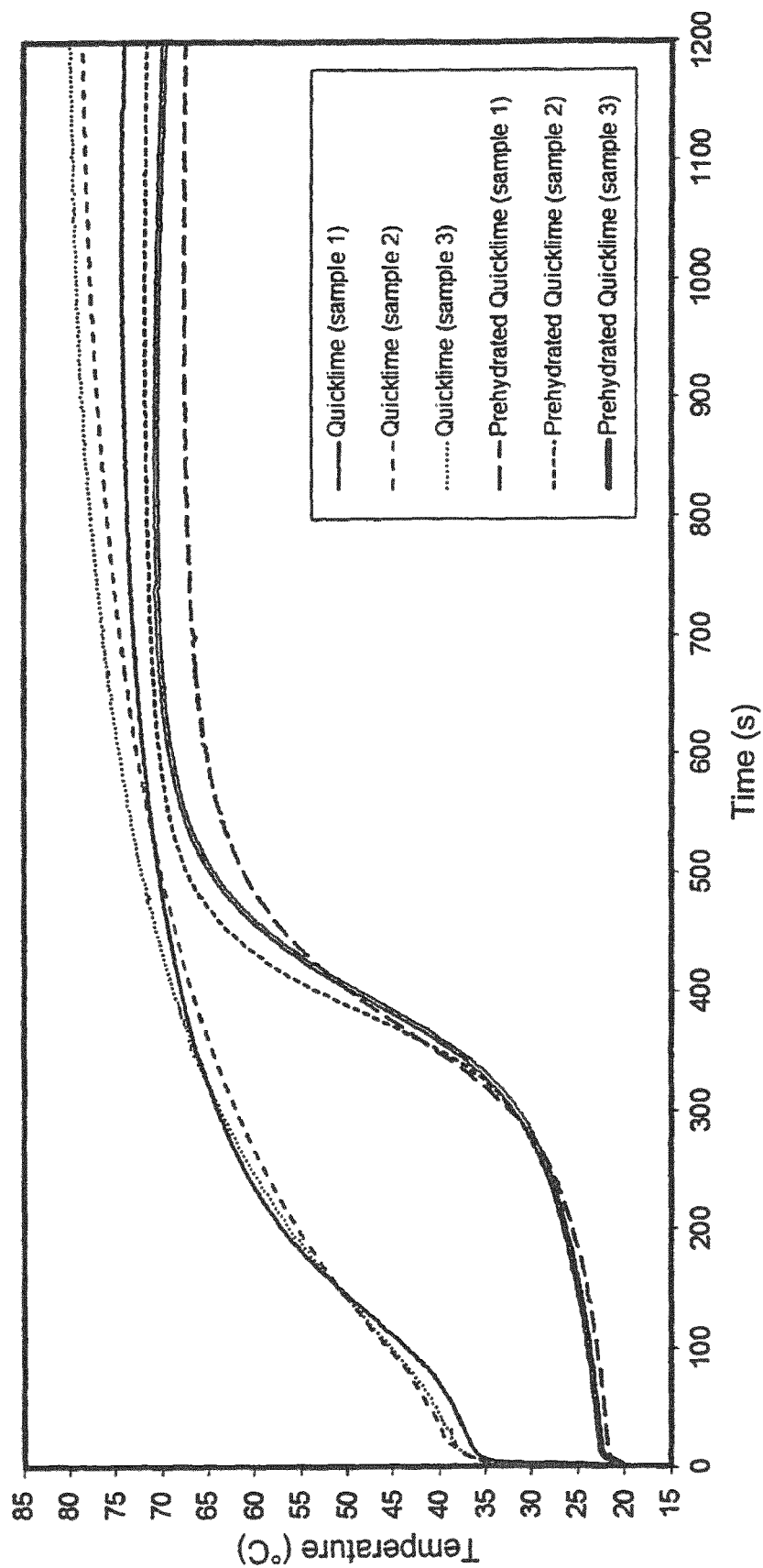
FIG. 2 is a graph showing the temperature evolution during slaking reaction of either quicklime or prehydrated lime for manufacturing milks of slaked lime according to example 2.

As it can be seen from FIG. 2, partial hydration of quicklime increases the time necessary to reach 30° C., generating therefore a lag time. The time necessary to reach 60° C. is also slightly increased.

Example 3.—Forming a Milk of Lime of Great Fineness from Prehydrated Lime in Batch Another batch of quicklime (crushed to reach $d_{90}$<90 μm) has been submitted to a partial hydration step leading to a prehydrated lime as explained in Example 1.

Granulometry curves of both quicklime and prehydrated lime are measured in the same way as disclosed in Example 1. The results are shown in Table 4.

TABLE 4

| | $Ca(OH)_2$ content % | Granulometry | | | | | |
|---|---|---|---|---|---|---|---|
| | | d100 μm | d98 μm | d95 μm | d90 μm | d50 μm | d25 μm |
| Quicklime | 4.1 | 282 | 170 | 144 | 113 | 12.9 | 6.1 |
| Prehydrated lime | 15.6 | 373 | 193 | 158 | 122 | 20.6 | 10.8 |

Both quicklime and prehydrated lime have been wet slaked with demineralized water in order to produce various milks of lime with different solid matter concentrations (5, 10, 15, 20 and 30 w % based on the total weight of the milk of slaked lime). The evolution of the temperature during manufacturing of said aforementioned milks of lime was monitored using the same protocol as the one given into EN 459-2. The results are illustrated in FIGS. 3 (milks of slaked lime at different concentrations produced from quicklime according to prior art) and 4 (milks of slaked lime at different concentrations produced from prehydrated lime according to the invention).

Figure 3:
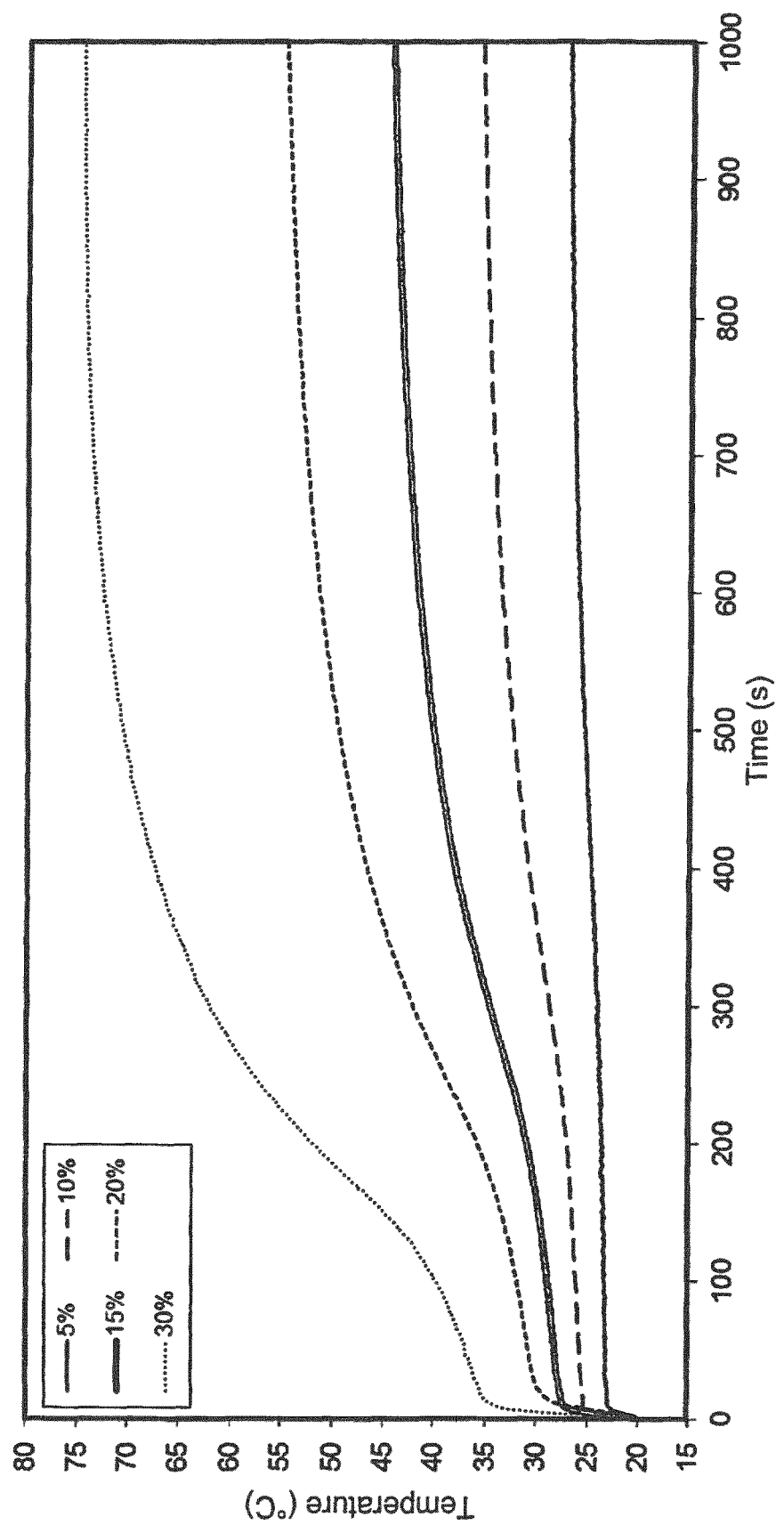
FIG. 3 is a graph showing the temperature evolution during slaking reaction of quicklime for manufacturing milk of lime at different solid matter concentrations according to example 3.
Figure 4:
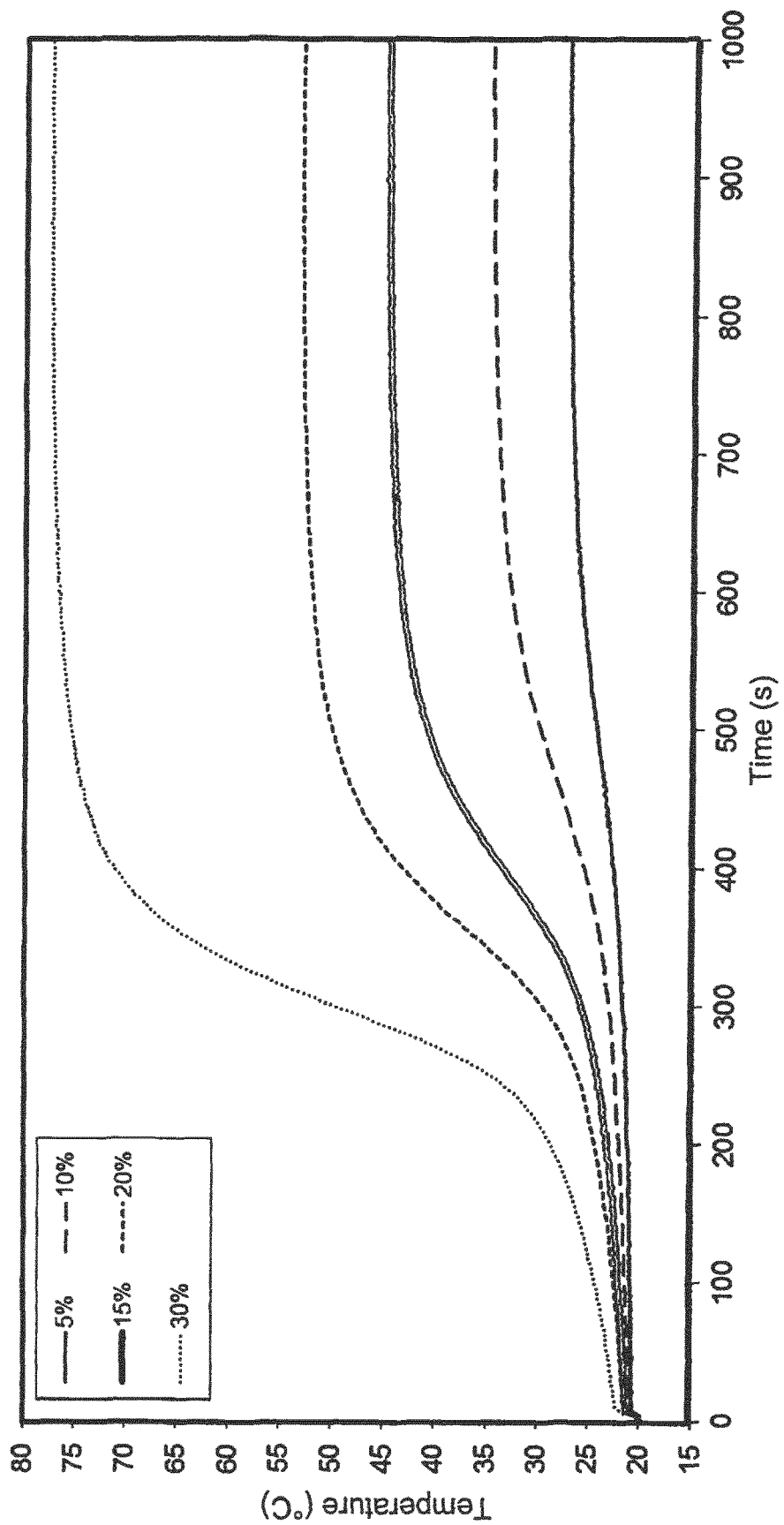
FIG. 4 is a graph showing the temperature evolution during slaking reaction of prehydrated lime for manufacturing milk of slaked lime of the present invention at different solid matter concentrations according to example 3.

As shown in FIGS. 3 and 4, the evolution of the temperature during wet slaking for manufacturing milk of slaked lime, either from quicklime or from prehydrated lime, shows different profiles depending on the milk of lime concentration. More precisely, higher concentrations of solid matter in the milk of lime lead to higher temperatures reached during its manufacturing. For example, when milk of lime is produced from prehydrated lime, the maximum temperature reached for a 30 w % $Ca(OH)_2$ milk of slaked lime is 75° C. (167° F.) while it is only 27° C. (80.6° F.) for a 5 w % $Ca(OH)_2$ milk of slaked lime.

As it can be further seen from FIG. 4, prehydrated lime requires longer time to reach 30° C. (86° F.) compared to quicklime at a same solid matter concentration. Moreover, prehydrated lime further exhibits steeper curves for all concentrations of milk of slaked lime compared to quicklime.

The granulometry of the aforementioned milks of slaked lime have been measured in the same way as in Example 1. They have been compared with the granulometry of milks of lime produced from fully hydrated lime at various solid matter contents. The results are shown in Tables 5 and 6.

As it can be seen from Table 5, when producing milk of lime from either quicklime or fully hydrated lime according to prior art, it is not possible to control the granulometry of the so-formed milk of lime by adjusting the solid matter concentration since no correlation can be observed between these two parameters.

However, as it can be seen from Table 6, when producing milk of slaked lime from prehydrated lime, according to the invention, increasing the solid matter concentration leads to finer granulometry of the slaked lime particle in the so-formed milk of slaked lime. For example, raising the milk of lime concentration from 5 to 30 w % reduces the $d_{50}$ value from 9.6 to 6.3 µm.

TABLE 5

| Milk Of Lime | | Granulometry | | | | | |
|---|---|---|---|---|---|---|---|
| | Dry content % | d100 µm | d98 µm | d95 µm | d90 µm | d50 µm | d25 µm |
| Fully hydrated Lime (prior art) | 100 (dry lime) | 282 | 158 | 116 | 53 | 5.7 | 3.2 |
| | 20.4 | 410 | 174 | 114 | 38 | 6.7 | 3.6 |
| | 30.2 | 373 | 177 | 123 | 56 | 6.1 | 3.3 |
| Quicklime (prior art) | 6.4 | 101 | 40 | 32 | 27 | 11.4 | 6.3 |
| | 11.3 | 177 | 39 | 31 | 26 | 10.1 | 5.5 |
| | 16.3 | 111 | 41 | 32 | 26 | 9.5 | 5.0 |
| | 21.1 | 213 | 73 | 41 | 29 | 9.7 | 5.1 |
| | 30.2 | 234 | 82 | 43 | 28 | 8.5 | 4.4 |

TABLE 6

| Milk Of Lime | | Granulometry | | | | | |
|---|---|---|---|---|---|---|---|
| | Dry content % | d100 µm | d98 µm | d95 µm | d90 µm | d50 µm | d25 µm |
| Prehydrated lime | 5.3 | 53 | 32 | 27 | 22 | 9.6 | 5.5 |
| | 10.2 | 53 | 31 | 26 | 21 | 8.5 | 4.9 |
| | 14.7 | 48 | 30 | 25 | 19 | 8.1 | 4.6 |
| | 19.4 | 48 | 30 | 25 | 19 | 7.8 | 4.5 |
| | 29.4 | 48 | 29 | 23 | 15 | 6.3 | 3.5 |

As a conclusion, prehydrated lime not only reduces the granulometry of a milk of slaked lime at 30 w % $Ca(OH)_2$ with respect to the total weight of the milk of slaked lime but also at far lower concentration such as 5 w % $Ca(OH)_2$ with respect to the total weight of the milk of slaked lime. Indeed, the mean value of $d_{50}$ is 2 µm smaller all through the concentration range and the $d_{100}$ is also rather low: around 50 µm all through the concentration range for the milk of slaked lime obtained from prehydrated lime. This shows the less tendency of this process to produce agglomerates.

The temperature rise is so marginal at 5% dry content that the slaking facility will not face dust as well as reagglomeration problems that are commonly experienced with standard quicklime during manufacturing of a fine milk of slaked lime.

The conductivity reactivity of the aforementioned milks of slaked lime was also determined through the measurement of their solubility index. The results are given in Table 7.

TABLE 7

| Milk of Lime | | Solubility index | | |
|---|---|---|---|---|
| | Dry content % | ζ100 s | ζ90 s | ζ63 s |
| Fully hydrated lime (prior art) | 100 (dry lime) | 104 | 5.0 | 2.0 |
| Quicklime (prior art) | 6.4 | 122 | 15.5 | 4.0 |
| | 11.3 | 132 | 15.0 | 3.0 |
| | 16.3 | 155 | 16.5 | 3.5 |
| | 21.1 | 151 | 17.0 | 4.0 |
| | 30.2 | 161 | 15.0 | 3.5 |
| Prehydrated lime | 5.3 | 35 | 6.0 | 2.5 |
| | 10.2 | 47 | 6.0 | 2.5 |
| | 14.7 | 34 | 7.0 | 3.5 |
| | 19.4 | 34 | 5.0 | 2.0 |
| | 29.4 | 23 | 6.0 | 3.0 |

Example 4.—Forming a Milk of Lime of Great Fineness from Prehydrated Lime in Batch Quicklime has been prehydrated with different amounts of water from 0 to 16 w % with respect to the amount of quicklime in order to reach prehydrated lime with different amounts of $Ca(OH)_2$ in the coating around the quicklime core. The different samples of prehydrated lime thereby obtained were further slaked to produce milks of slaked lime.

One kg of quicklime is placed in a 4 L laboratory mixer consisting of a fixed bowl fitted with a single paddle-like mixing blade. A plastic film is covering the bowl after filling the quicklime. Small holes are made in the film in order to spray the water. The water is sprayed quickly on the quicklime. Mixing is done during the time necessary for the partial hydration reaction to be completed.

The prehydrated lime is taken out from the mixer and let cooled down until room temperature is reached in a confined container before slaking to milk of slaked lime. Slaking can be done either quickly after partial hydration, in continuation of such step or days after partial hydration.

The impact of quicklime prehydration level on the granulometry of slaked lime particles in the resulting milk of slaked lime was studied, the latter being measured as explained in Example 1.

The solubility index of the resulting milk of slaked lime was also measured, according to the procedure disclosed in Example 3. The results are given in Table 8.

Figure 5:
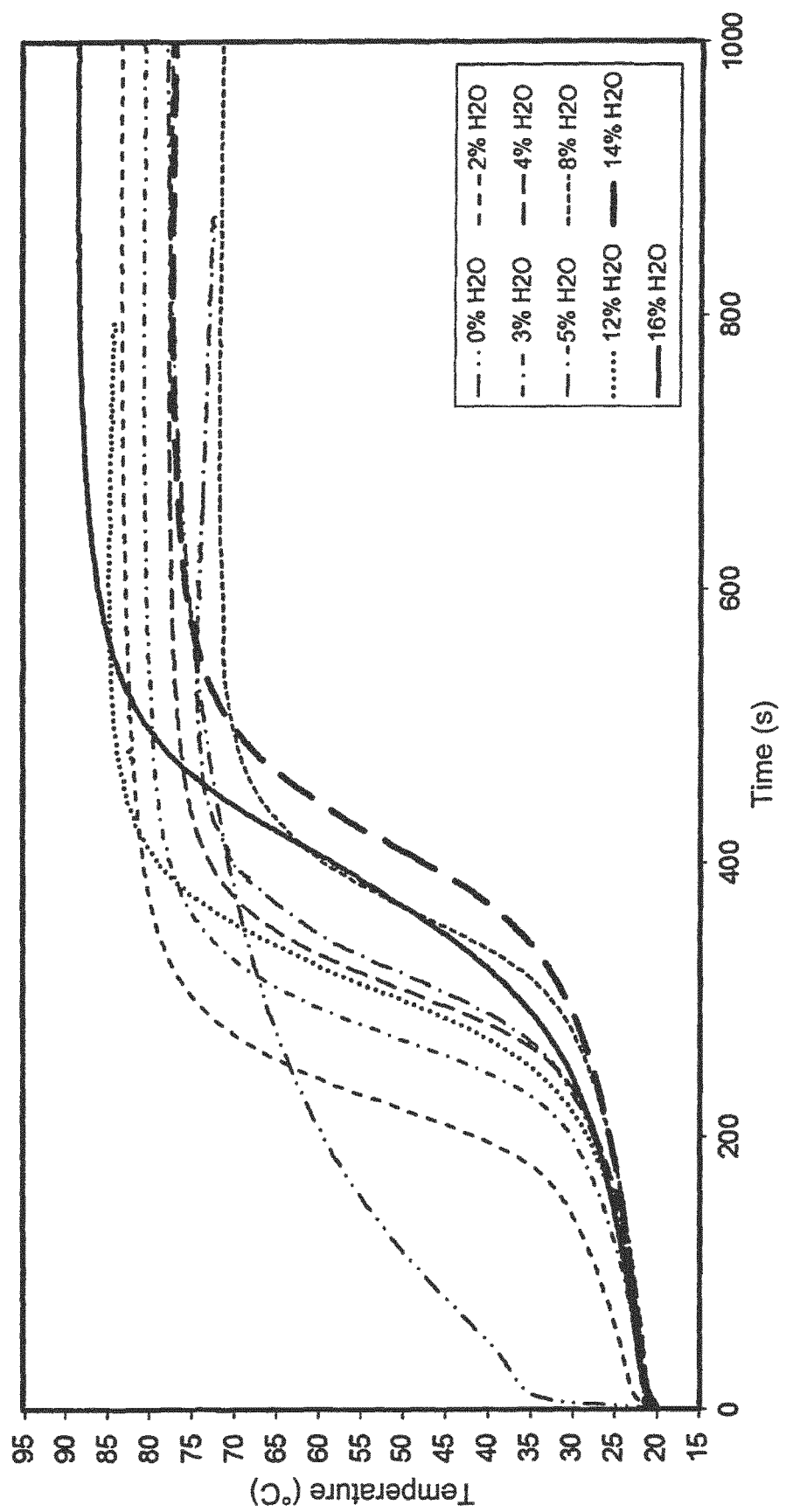
FIG. 5 is a graph showing the temperature rise reactivity curves of the lime samples according to example 4 during wet slaking, measured according to EN 459-2 depending on the amount of water present in the prehydrated lime.

The temperature evolution during wet slaking of said aforementioned samples was also measured according to EN 459-2. The results are illustrated in FIG. 5.

TABLE 8

| Prehydration by adding $H_2O$ % | $Ca(OH)_2$ expected % | $Ca(OH)_2$ measured % | $CaCO_3$ % | Granulometry | | | | | | Dry content % | Max. temp. reached ° C. | Solubility index | | |
|---|---|---|---|---|---|---|---|---|---|---|---|---|---|---|
| | | | | d100 µm | d98 µm | d95 µm | d90 µm | d50 µm | d25 µm | | | ζ100 s | ζ90 s | ζ63 s |
| 0 | 0 | 0.6 | 2.1 | 194 | 79 | 48 | 29 | 7.8 | 4.2 | 30.0 | 77.2 | 286 | 12.5 | 3.5 |
| 2 | 8 | 6.6 | 2.4 | 44 | 27 | 21 | 14 | 6.1 | 3.5 | 30.0 | 82.4 | 29 | 4 | 2 |
| 4 | 16 | 13.9 | 2.3 | 44 | 15 | 13 | 11 | 5.7 | 3.4 | 30.0 | 80.0 | 28.5 | 3 | 2 |
| 8 | 30 | 26.3 | 2.4 | 44 | 27 | 17 | 13 | 6.4 | 3.7 | 30.0 | 75.7 | 15.5 | 2 | 1 |
| 12 | 44 | 37.7 | 4.1 | 17 | 12 | 10 | 9 | 4.6 | 2.7 | 40.0 | 87.8 | — | — | — |
| 14 | 50 | 47.0 | 3.8 | 17 | 11 | 10 | 9 | 4.6 | 2.7 | 40.0 | 79.3 | — | — | — |
| 16 | 57 | 55.52 | 4.0 | 16 | 11 | 10 | 8 | 4.1 | 2.4 | 45.0 | 88.5 | — | — | — |

As it can be seen from Table 8, it was possible to produce high solid content milk of slaked lime, and reduce the granulometry of the milk of slaked lime by increasing the amount of water added onto the quicklime during prehydration, thereby producing prehydrated lime with increasing level of $Ca(OH)_2$ in the coating around the quicklime core.

Milk of slaked lime is finer when the amount of water added during the prehydration is higher than the minimum amount of water necessary to build a coating of slaked lime.

It is shown that spraying 16 w % water onto quicklime (16 g water on 100 g quicklime) increases the amount of $Ca(OH)_2$ to a similar amount than the one expected in theory (in theory meaning such as if no water losses would occur). It was indeed possible to reach prehydrated lime containing 55.5 w % $Ca(OH)_2$ compared to 56.7 w % $Ca(OH)_2$ (theoretical calculated value), despite the higher temperature that was reached.

The partial hydration of quicklime with 16 w % water while reaching 55 w % $Ca(OH)_2$ as mentioned further allows to produce, after slaking, a milk of slaked lime containing 45 w % solid particles of slaked lime with a slaking temperature reaching max. 88° C. (190° F.). The process used in this example not only increases milk of slaked lime concentration but reduces the $d_{50}$ from 7.8 µm to 4.1 µm and $d_{100}$ from 194 µm to 16 µm.

As it can be seen from FIG. 5, increasing the water content during partial hydration increases as well the lag time which support the 'coating' theory.

Example 5.—Forming a Milk of Lime of Great Fineness from Prehydrated Lime in a Batch Four different quicklimes, showing different reactivities have been prehydrated with 4 w % water.

The first quicklime (A) is the quicklime used in Batch Process Example 1, crushed to reach $d_{90}$<90 µm and showing a $t_{60}$ of 192 sec according to EN 459-2. The second quicklime (B) has a temperature rise reactivity $t_{60}$ of 133 sec according to the same standard and has a mean particle size between 0-2 mm, sieved to reach a maximum particle size of 500 µm while the latter (C) also crushed to reach $d_{90}$<90 µm shows a temperature rise reactivity $t_{60}$ of 58 sec.

After spraying 4 w % water for partial hydration, slaking was performed and the granulometry of the particles in the resulting milks of slaked lime was measured as explained in Example 1.

The granulometry of the quicklime samples used for the prehydration is shown in Table 9 while the granulometry of the slaked lime particles in the resulting milks of slaked lime is shown in Table 10.

The efficiency of the partial hydration appears to be correlated with quicklime temperature rise reactivity. Indeed, fineness of the particles in milk of slaked lime is increasing with the increasing starting quicklime reactivity, e.g. lower $t_{60}$ value, (higher temperature rise reactivity meaning less time to reach 60° C. in water).

It must be noted however that the impact of the partial hydration is less relevant for highly reactive quicklime since such compound is already known to produce fine milk of lime. For less reactive quicklime, on the other hand, the impact of partial hydration is particularly surprising, since it allows reaching fine milk of slaked lime, even if the initial quicklime has a limited temperature rise reactivity $t_{60}$.

TABLE 9

| | Sample | Reactivity t60 s | Granulometry | | | | | |
|---|---|---|---|---|---|---|---|---|
| | | | d100 µm | d98 µm | d95 µm | d90 µm | d50 µm | d25 µm |
| Quicklime | A | 192 | 234 | 82 | 43 | 28 | 8.5 | 4.4 |
| | B | 133 | 410 | 158 | 68 | 34 | 6.3 | 3.1 |
| | C | 58 | 44 | 25 | 10 | 8 | 3.7 | 2.1 |

TABLE 10

| | Sample | Granulometry | | | | | |
|---|---|---|---|---|---|---|---|
| | | d100 µm | d98 µm | d95 µm | d90 µm | d50 µm | d25 µm |
| Milk of lime | A | 49 | 29 | 23 | 15 | 6.3 | 3.5 |
| | B | 48 | 30 | 24 | 14 | 6.1 | 3.3 |
| | C | 48 | 28 | 22 | 13 | 5.0 | 2.3 |

Example 6.—Forming a Milk of Lime of Great Fineness from Prehydrated Lime in a Batch Process Quicklime sample as in Example 1 was prehydrated with respectively 12 and 16 w % water. The resulting prehydrated limes were both slaked to produce milks of slaked lime containing respectively 40 and 34 w % solid particles of slaked lime. The procedure has been reproduced but this time 1 and 2 w % of saccharose with respect to the weight of quicklime, were respectively added into the predetermined amount of water added for slaking. The granulometry of the slaked lime particles in the milks of slaked lime has been measured as explained in Example 1. The results are given in Table 11.

TABLE 11

| Prehydration | Granulometry | | | | | |
|---|---|---|---|---|---|---|
| | d100 (µm) | d98 (µm) | d95 (µm) | d90 (µm) | d50 (µm) | d25 (µm) |
| 12% H2O | 17 | 12 | 10 | 9 | 4.6 | 2.7 |
| 12% H2O + 1% saccharose | 14 | 9 | 8 | 8 | 4 | 2.4 |
| 12% H2O + 2% saccharose | 14 | 9 | 8 | 7 | 4 | 2.4 |
| 16% H2O | 16 | 11 | 10 | 8 | 4.1 | 2.4 |
| 16% H2O + 2% saccharose | 14 | 9 | 8 | 7 | 3.8 | 2.3 |
| 16% H2O + 4% saccharose | 13 | 9 | 8 | 7 | 3.7 | 2.2 |

Figure 6:
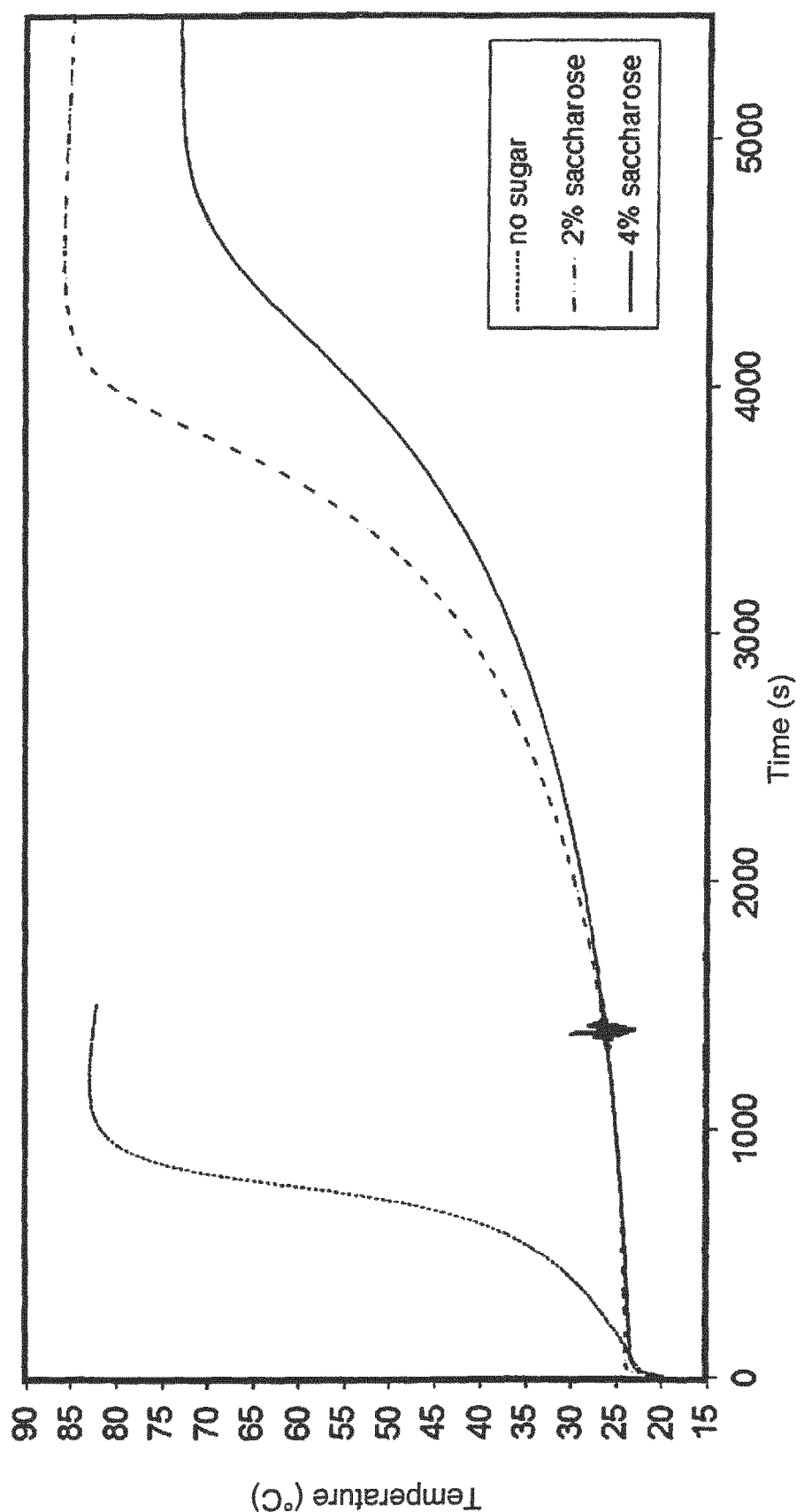
FIG. 6 is a graph showing the temperature evolution during the wet slaking of the samples according to example 6.

The temperature evolution during the wet slaking was also measured and the results are shown in FIG. 6.

As it can be seen, saccharose is dramatically increasing the lag time together with decreasing the granulometry of the slaked lime particles in the milk of slaked lime.

Example 7.—Forming a Milk of Lime of Great Fineness from Prehydrated Lime in a Batch Quicklime samples have been taken every week during 3 weeks out of the same plant.

A first portion of each sample was commonly wet slaked to produce milk of slaked lime containing 30 w % solid particles of slaked lime according to the prior art.

A second portion of each sample was prehydrated in a conveying screw with 4 w % water with respect to the quicklime weight. After partial hydration, the prehydrated lime was subjected to wet slaking for producing milk of slaked lime according to the invention.

The granulometry of the milks of slaked lime was measured as in Example 1. The results are given in Table 12.

TABLE 12

|  | Batch no | Ca(OH)$_2$ % | Granulometry | | | | | | Dry content % |
|---|---|---|---|---|---|---|---|---|---|
|  |  |  | d100 μm | d98 μm | d95 μm | d90 μm | d50 μm | d25 μm |  |
| Milk from quicklime (prior art) | 1 | 2.1 | 213 | 86 | 49 | 31 | 9.7 | 5.0 | 30.1 |
|  | 2 | 1.0 | 194 | 79 | 47 | 30 | 8.7 | 4.6 | 30.2 |
|  | 3 | 1.6 | 257 | 140 | 103 | 53 | 13.0 | 6.5 | 30.7 |
| Milk from prehydrated lime | 1 | 17.3 | 53 | 32 | 27 | 21 | 7.1 | 3.9 | 28.4 |
|  | 2 | 17.3 | 53 | 32 | 27 | 20 | 7.0 | 3.9 | 29.0 |
|  | 3 | 16.3 | 101 | 39 | 30 | 24 | 7.3 | 4.0 | 28.9 |

As it can be seen, when directly slaking quicklime as conventionally done, $d_{50}$ is varying from 8.7 μm to 13.0 μm. When a partial hydration step is performed under controlled condition before wet slaking, $d_{50}$ variation is reduced to 7.0-7.3 μm.

Comparative Example 8.—Forming a Milk of Lime of Great Fineness from Naturally Aged Prehydrated Lime Quicklime samples have been stored at room atmosphere on a bench, allowing to pick-up water at different levels to reach max. 9 w % Ca(OH)$_2$ in the layer surrounding the quicklime core. Milks of slaked lime containing 30 w % solid particles of slaked lime were then produced by slaking with water such naturally aged lime. For each sample, a post addition of 2 w % water with respect to the weight of the naturally aged lime (naturally prehydrated lime—not controlled prehydrated lime) was also performed. The temperature evolution was measured during the wet slaking of the samples and the granulometry of the slaked lime particles in the milk of slaked lime was measured as explained in Example 1. The results are shown in Table 13.

TABLE 13

| Aging with | t60 min. | Ca(OH)$_2$ % | Granulometry | | | | | |
|---|---|---|---|---|---|---|---|---|
|  |  |  | d100 μm | d98 μm | d95 μm | d90 μm | d50 μm | d25 μm |
| low water uptake | 1.8 | 2.9 | 101 | 55 | 31 | 23 | 5.1 | 2.8 |
| further prehydration with 2% H$_2$O | 5.0 | — | 84 | 39 | 30 | 24 | 5.9 | 2.9 |
| medium water uptake | 5.3 | 5.8 | 194 | 109 | 85 | 63 | 13.1 | 5.4 |
| further prehydration with 2% H$_2$O | 11.1 | — | 234 | 128 | 93 | 66 | 15.6 | 6.0 |
| high water uptake | 9.5 | 9.0 | 213 | 133 | 113 | 89 | 19.8 | 6.9 |
| further prehydration with 2% H$_2$O | 14.8 | — | 257 | 134 | 103 | 71 | 16.0 | 6.5 |

As it can be seen, this natural partial hydration does not produce fine milk of lime with no agglomerates. Moreover, a controlled post addition of 2 w % water by spraying (i.e a controlled prehydration) does not produce the beneficial effect observed when starting from quicklime.

Example 9.—Forming a Milk of Lime of Great Fineness from Prehydrated Lime in Batch The same quicklime as the one used in Example 1 is submitted during 1 hour to a gas stream containing 10% V/V water steam at 150° C. (302° F.) until around 4% weight gain is obtained. Same is done with a gas at 200° C. (392° F.) containing 10% V/V water steam and 15% V/V CO$_2$.

Figure 7:
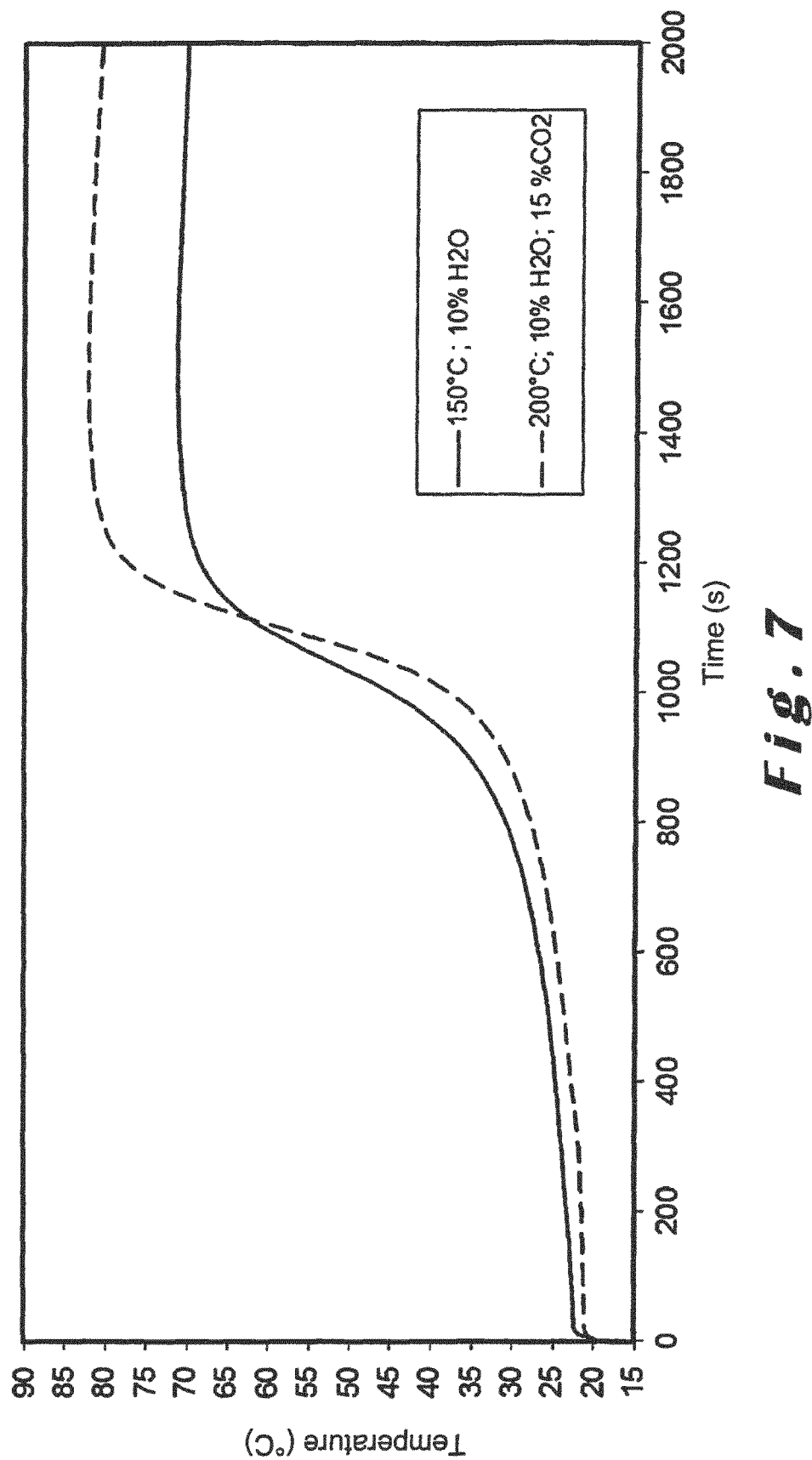
FIG. 7 is a graph showing the temperature evolution during the wet slaking of the samples according to example 9.

Milk of slaked lime containing 30 w % solid particles was then produced by slaking with water the prehydrated lime sample thereby obtained. The temperature evolution was measured during the slaking of the samples and the granulometry of the slaked lime particles in the milk of slaked lime was measured as explained in Example 1. The results are shown in Table 14 and FIG. 7.

TABLE 14

| | Aging with | Granulometry | | | | | |
|---|---|---|---|---|---|---|---|
| | | d100 μm | d98 μm | d95 μm | d90 μm | d50 μm | d25 μm |
| Prehydrated lime 30% milk of lime | 150° C. 10% steam | 194 | 117 | 90 | 63 | 9.2 | 5.2 |
| | 200° C. 10% steam + 15% CO$_2$ | 257 | 148 | 120 | 81 | 9.9 | 5.5 |
| | 150° C. 10% steam | 44 | 28 | 21 | 13 | 5.7 | 3.2 |
| | 200° C. 10% steam + 15% CO$_2$ | 44 | 28 | 22 | 14 | 5.9 | 3.2 |

As it can be seen, both treatments allow producing fine 30% solid particles milk of lime of same granulometry as obtained by pulverizing water as in Example 2. As it can be seen from FIG. 7, both treatments generate a lag time in the temperature evolution.

Example 10.—Forming a Milk of Lime of Great Fineness from Paste of Lime: Batch Process Twenty-one hundred grams of Quicklime fines (<6 mm) are introduced into a 4 L laboratory mixer. Although the initial experiments used quicklime fines, pebble product or other size lime could also be used. The mixer's motor should be powerful enough to turn the dry quicklime as well as the moistened prehydrated/quicklime clumps that form during the process. The total slaking time from quicklime to slurry was set for 15 minutes.

The flow rate of water mixture (water with or without additives) for the examples which follow was set to 4.79 cm$^3$/s (0.076 gpm) which was theoretically calculated for a batch that would slake 2100 grams of quicklime in order to form subsequently a prehydrated lime, a paste of lime and the milk of lime of great fineness along addition of water mixture under the form of a mist. The water and a viscosity reducer mixture were introduced from the top of the mixer, enabling all the quicklime in the mixer to equally interact with water, thereby forming the intermediate prehydrated lime before paste of lime and finally said milk of slaked lime of great fineness.

Towels were placed about the mixer bowl opening to control dust and steam emission. The water and viscosity reducer mixture should be in fine mist form which can also be referred as cone shaped mist. This condition is achieved by installing nozzles to mist the liquid mixture over the quicklime. A thermocouple with a data logger was installed on the mixer literally touching the quicklime, the paste of lime and milk of slaked lime in the mixing bowl in order to track the temperature rise during the slaking process. The slaking should start simultaneously and is continuous/progressive. The water mixture initially reacts with the quicklime, thereby forming intermediate prehydrated lime. After prehydrated lime forms, due to the excess water in the mix, particles will start clumping together. The prehydrated lime particles then form a mud that dissolutes rapidly with the continued addition of at least water mixture forming firstly a paste of slaked lime and finally, upon addition of water mixture, diluting until a slaked milk of lime of a 45 w % solid content is reached.

Example 11.—Forming a Milk of Lime of Great Fineness from a Paste of Lime; Continuous Process Three hundred and forty four pounds (156 kg) of crushed high calcium quicklime less than ½" or 1.27 cm) was placed in a 20 cubic foot (566 dm$^3$) paddle mixer. A spray bar with six conical spray nozzles was placed on the mixer to deliver the 654 pounds (296.7 kg) of water containing 4.91 pounds (2.23 kg) of sorbitol at a rate of 4.75 gallons per minute (18 dm$^3$/min.). The mixer was set for 37.5 rotations per minute and the batch was completed at 16.5 minutes. By delivering a mist of water continuously over the quicklime, the reaction temperature reached 435° F. (224° C.) creating very fine hydrate particles. The resulting slurry had the characteristics shown in Table 15.

TABLE 15

| % Solids | 45.9 |
|---|---|
| Initial Viscosity cP (mPa · s) | 511 |
| Viscosity after 30 days cP (mPa · s) | 617 |
| PSD d$_{50}$ μm | 2.65 |

Example 12.—Forming a Lime of Great Fineness from Past of Lime: Continuous Process Two hundred and twenty nine pounds (103.9 kg) of crushed high calcium quicklime (less than ½" or 1.27 cm) was placed in a 20 cubic foot (566 dm$^3$) paddle mixer. A spray bar with eight conical spray nozzles was placed on the mixer to deliver the 403 pounds (182.8 kg) of water containing 3.27 pounds (1.48 kg) of sorbitol at a rate of 3.8 gpm (14.4 dm$^3$/min.). After 8 minutes the water flow rate was increased to 4.6 gpm (17.4 dm$^3$/min.). After 12 minutes, 1.16 pounds (0.53 kg) of dispersant (Neomere Tech 646) were added directly to the slurry and the mixer speed was increased from 37.5 to 125 rpm. The slurry was screened to 150 μm to remove coarser agglomerations. The results are shown in Table 16.

TABLE 16

| % Solids | 46.3 |
|---|---|
| Initial Viscosity cP (mPa · s) | 127 |
| Viscosity after 30 days cP (mPa · s) | 243 |
| PSD d$_{10}$ μm | 0.871 |
| PSD d$_{50}$ μm | 2.55 |
| PSD d$_{90}$ μm | 29.0 |
| PSD d$_{98}$ μm | 82.4 |

An alternative to screening the slurry could be to run through a high shear disagglomeration machine. Two portions of the unscreened slurry at 46.3% solids was submitted to two different high speed conditions at 1330 rpm and 1770 rpm and produced the particle size distribution as shown in Table 17.

TABLE 17

| | d$_{10}$ μm | d$_{50}$ μm | d$_{90}$ μm | d$_{98}$ μm | d$_{100}$ μm | % solids |
|---|---|---|---|---|---|---|
| 1330 rpm | 0.830 | 2.23 | 22.6 | 71.3 | 143 | 49.4 |
| 1775 rpm | 0.831 | 2.24 | 20.8 | 63.4 | 130 | 48.5 |

Example 13.—Forming a Milk of Lime of Great Fineness from a Paste of Lime: Continuous Process The procedure according to example 10 has been followed. The amount and ratios of material used for Example 13 are shown in Table 18.

TABLE 18

| Material | Amount | Unit |
|---|---|---|
| Quicklime (CaO) | 2100 | g |
| Water (H$_2$O) | 4281 | g |
| Viscosity reducer | 36 | g |
| Total milk of lime | 4317 (liquid) | g |

Approximately 12 grams of sorbitol (viscosity reducer) were equally distributed in all three of the water portions, with the first two portions being applied by fine mist and the last (third) portion being dumped into the mixer. The temperature of reaction was achieved 260 to 315° C. (500 to 600° F.). Grit fell out of suspension which is related to the low viscosity values of <100 cP and the product was observed to have a stable viscosity for one month.

Table 19 is a comparison of various milk of lime products produced by the invention as compared to commercial slurries of the prior art.

The rate of settlement was measured in a 100 cm$^3$ graduated cylinder according to the standard ASTM C110-11.14. In this method, we measure the height (expressed in cm$^3$) of supernatant present in the cylinder. Since the cylinder have a capacity of 100 cm$^3$, those heights correspond also to a volumetric percentage.

while after 30 days, their viscosities have increased but to a limited extent such as to be similar to the one of the prior art reference.

Figure 8:
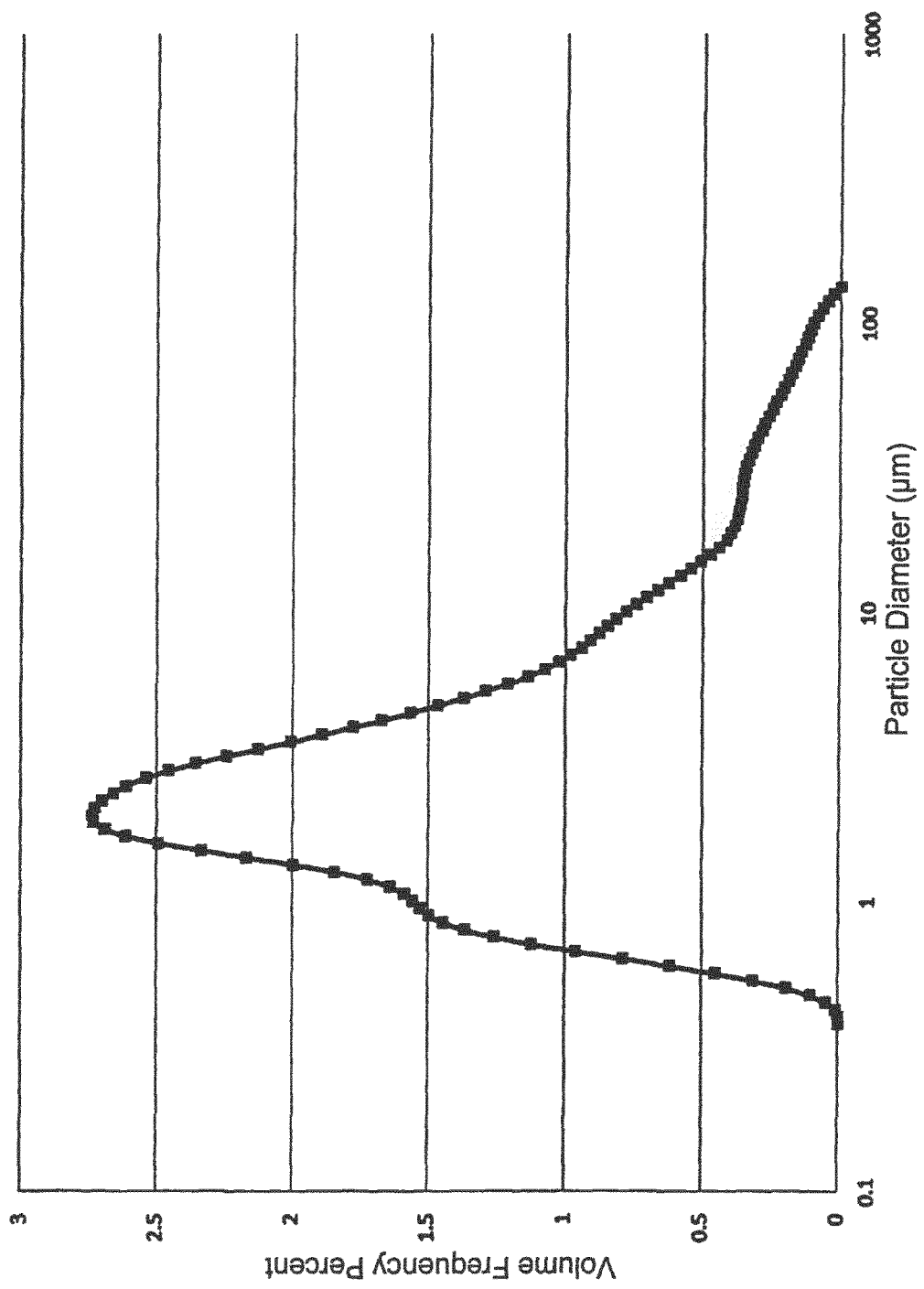
FIG. 8 is a graph showing the particle size distribution of a milk of slaked lime made according to the principles of the present invention.
Figure 9:
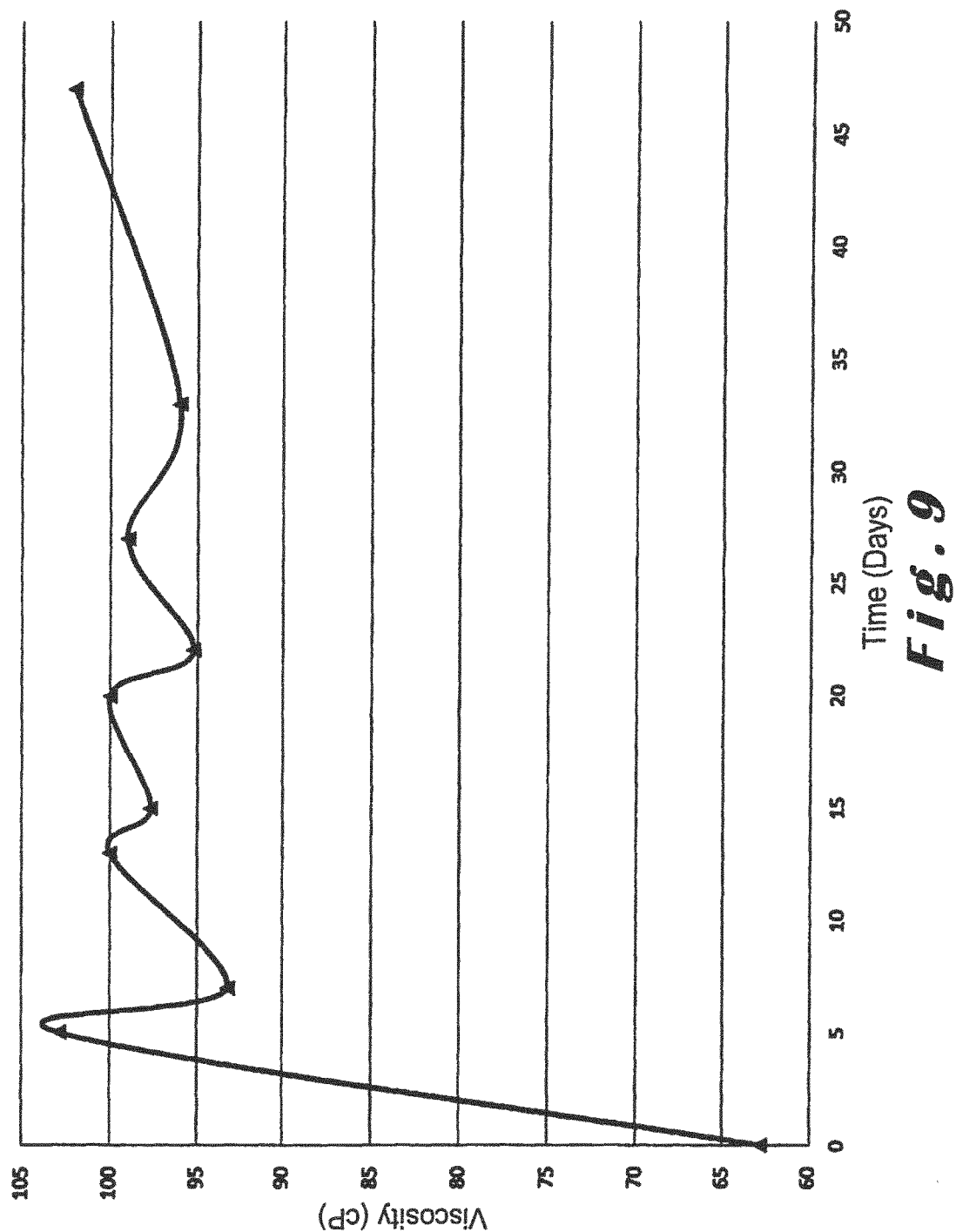
FIG. 9 is a graph illustrating the viscosity change over time for a milk of slaked lime of the invention.

The milk of slaked lime from Plant A quicklime and the Plant B quicklime, prepared according to the invention, exhibited the desired characteristics of:

d$_{50}$ in range of 2.5-3.5 µm;
slurries which were viscosity stable below 200 mPa·s after one month of testing;
% solids range from 42-44% by weight, based upon the weight of slurry;
Grit dropped out of suspension at low initial viscosities;
Settling rate slower than the commercial Neutralac SLS45™ product;

FIGS. 8 and 9 show the particle size distribution and viscosity change with time for a slurry made according to the method of the invention described in Example 13. These parameters are both within acceptable limits for the purpose of the experiments outlined above.

The most critical points in examples 10-13 are the introduction of the fine mist over the quicklime, maintaining an equal distribution of water mixture through the use of the fine spray mist, and the achievement of targeted temperatures through exothermic reaction of the quicklime with the water, i.e., a maximum temperature of reaction in the range from about 260° C.-350° C. (about 500-600° F.), as compared to a Portabatch® slaking system where the quicklime is added to the water once and maximum temperature of about 100° C. (212° F.) is reached.

Figure 10:
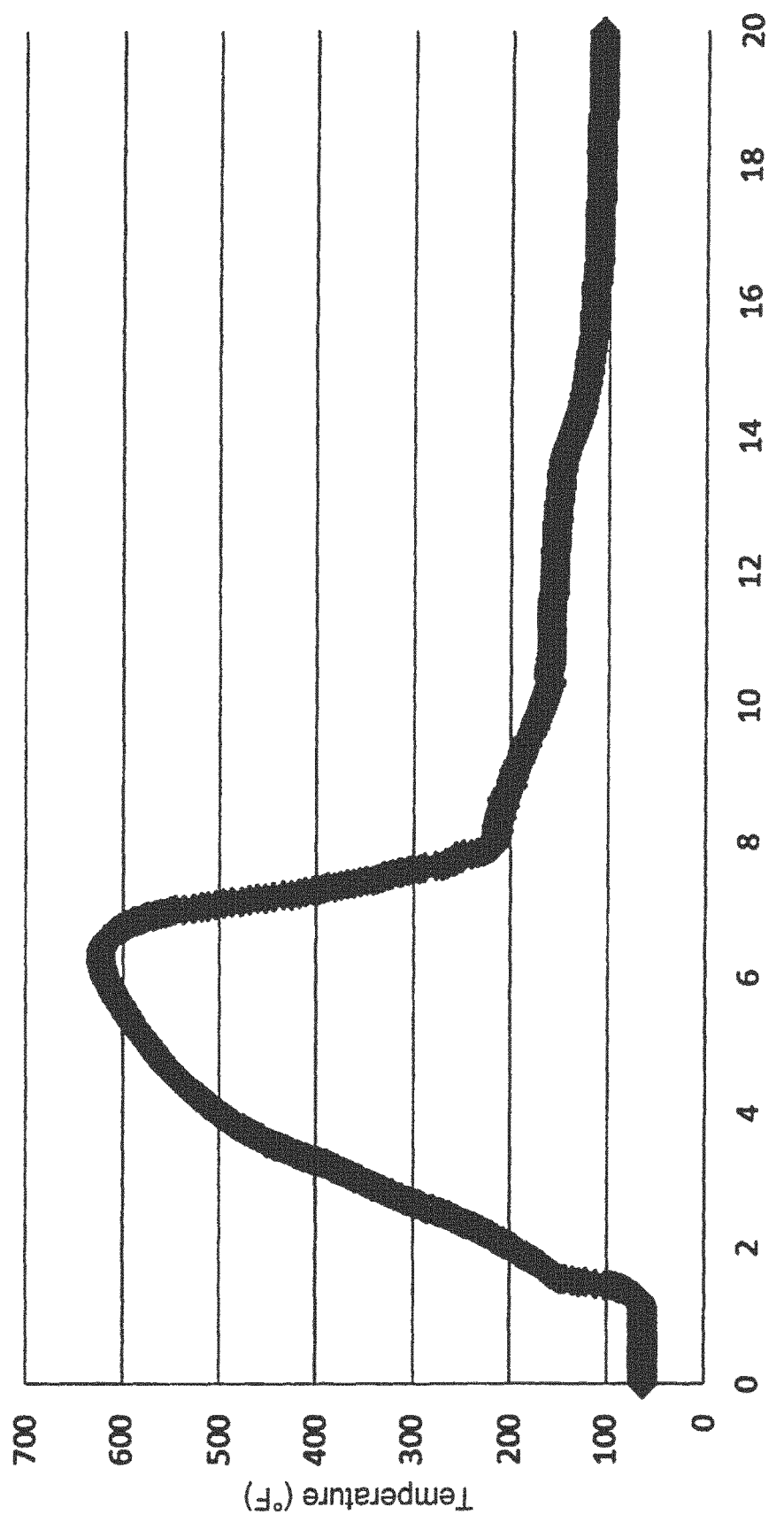
FIG. 10 is a graph illustrating the temperature profile obtained during the manufacturing of milk of slaked lime according to one embodiment of the invention, showing the maximum temperature of reaction achieved.

FIG. 10 shows the slaking temperature profile for a milk of slaked lime prepared according to the principles of the invention as illustrated in Example 13, showing the maxi-

TABLE 19

| Sample | d$_{50}$ µm | Initial Viscosity cP | 30 days viscosity cP | Percent Solids % | 325 Mesh (45 µm) % retained | Settling rate (vol %) After 24 hours | After 48 hours | After 28 days |
|---|---|---|---|---|---|---|---|---|
| Plant A milk of lime 44% | 3.02 | 57 | 188 | 43.5 | 2.60 | 1.0 | 3.0 | 6 |
| Plant B milk of lime 42% | 2.56 | 63 | 99 | 42.2 | 3.36 | 2.6 | 3.4 | 9.5 |
| Neutralac ™ SLS45 (prior art-reference) | 2.77 | 140 | 153 | 44.7 | 0.30 | <1 | 4.0 | 14 |
| Plant A Commercial Slurry 44% (prior art) | 12.0 | 1948 | 3084 | 44.7 | 6.48 | 7.9 | 7.9 | 3 |

The resulting milk of lime met the general criteria set for the project. Specifically, the Plant A and the Plant B quicklimes were slaked according to the method steps previously described in Example 13 with respect to the method of the invention. In Table 16, they are compared to the existing Neutralac™ SLS45 commercial product and to a "Plant A Commercial" which was a Portabatch type batch slaking operation where quicklime is added to water without pre-hydration step.

Figure 11:
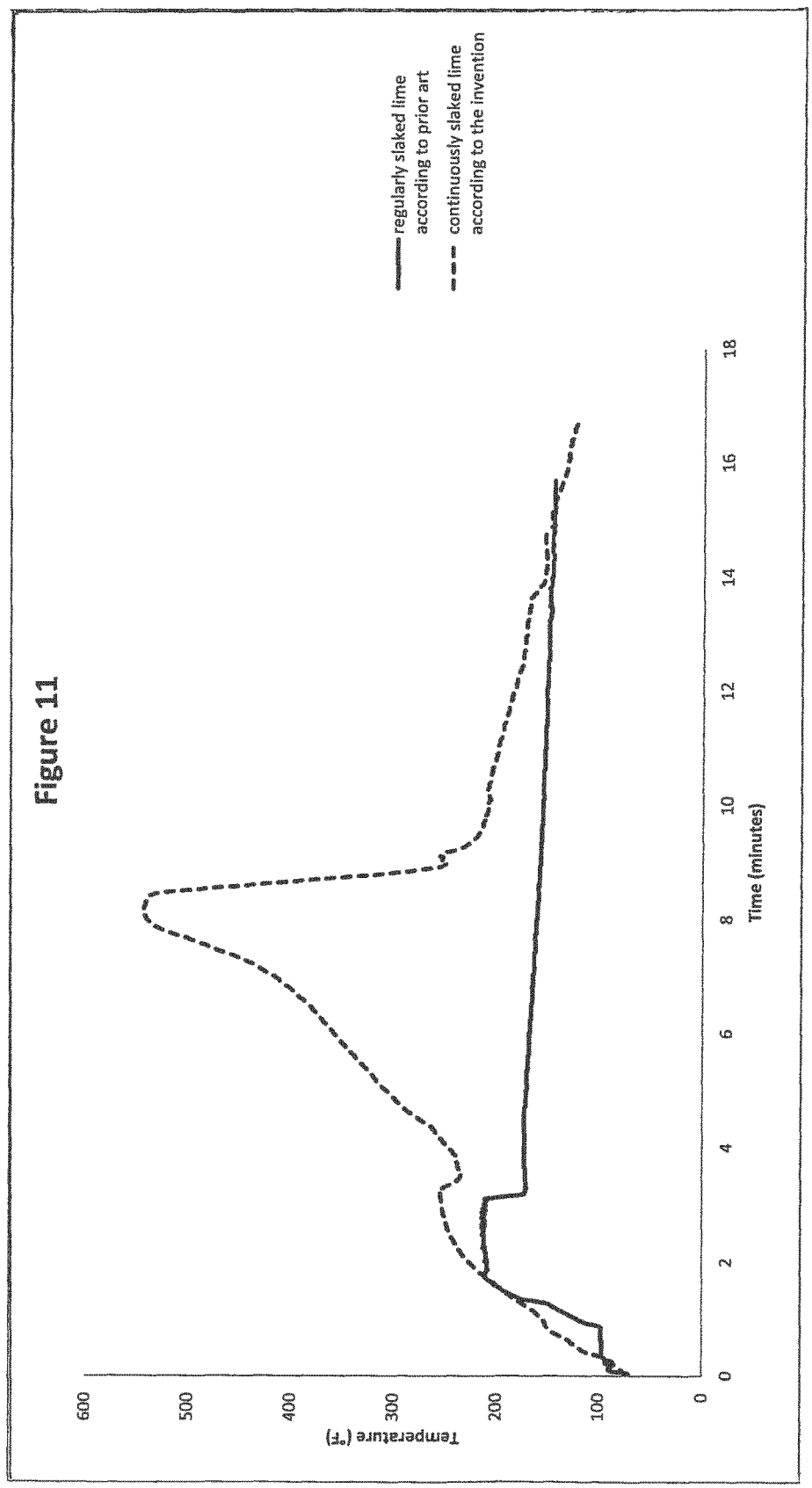
FIG. 11 is a graph comparing the temperature profile obtained during the manufacturing of milk of slaked lime according to one embodiment of the invention, with the temperature profile obtained during the manufacturing of milk of slaked lime according to the prior art.

For the milks of slaked lime according to the invention (Plant A and Plant B), their initial viscosities are lower than the one of the prior art of reference (Neutralac™ SLS45)

mum temperature of reaction in the desired range from about 260° C.-350° C. (about 500-600° F.), before rapidly cooling down with the continued addition of water. A dramatic difference can be seen in FIG. 11 between the slaking temperature profile of a milk of slaked lime made according to the invention as illustrated in example 13, as compared to the prior art milk of lime produced from "regularly slaked" quicklime. The prior art milk of slaked lime, made for example in a Portabatch® apparatus, peaks out at about 100° C. (212° F.).

Figure 12:
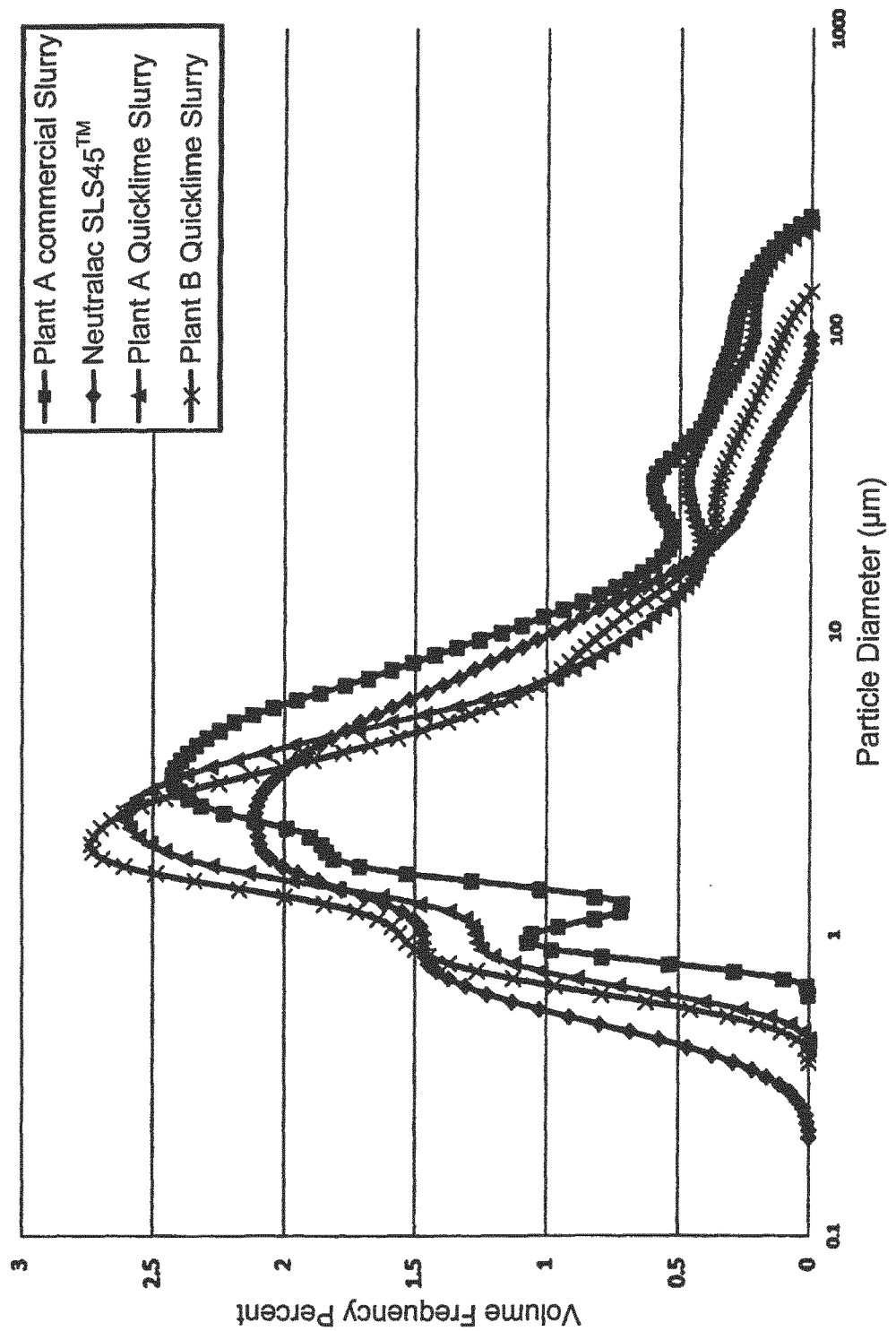
FIG. 12 is a graph which compares the particle size distribution of two milks of slaked lime made according to one embodiment of the invention with two prior art milks of slaked lime.

FIG. 12 is a graph showing a comparison of the particle size distribution for two milks of slaked lime made according to the principles of the invention as disclosed in example 13, as compared to two milks of slaked lime made by prior art methods. The milks of slaked lime of the invention are designated as the "Plant A Quicklime slurry" and "Plant B Quicklime slurry". These are compared to the Neutralac™ SLS45™ milk of lime and the "Plant A Commercial Slurry" which is a batch slaking operation where quicklime is added to water, as previously described. The results show more fine particles in the milks of slaked lime of the invention, but also a larger coarse fraction, which latter may be left in for a high quality regular slurry or screened out.

Figure 13:
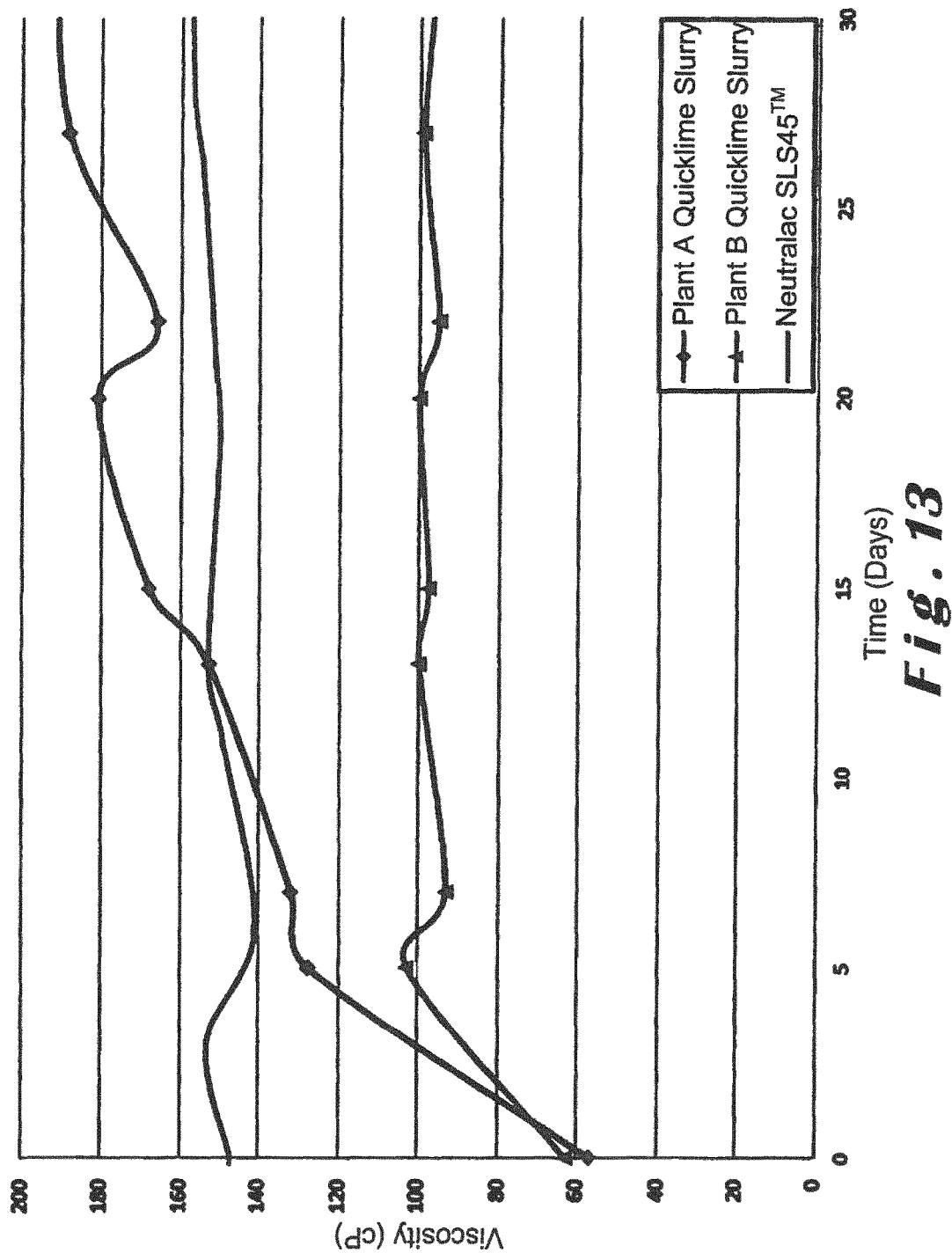
FIG. 13 is a graph comparing the viscosity change over time for two milks of slaked lime made according to one embodiment of the invention versus a prior art milk of slaked lime.

FIG. 13 is a graph of viscosity over time for two slurries of the invention as illustrated in example 13, designated as the "Plant A Quicklime Slurry" and the "Plant B Quicklime Slurry", as compared to a prior art Neutralac SLS45™ slurry. The milks of slaked lime made according to the principles of the invention illustrated in Example 13 exhibit a viscosity below 200 mPa·s after one month.

An invention has been provided with several advantages. The product made according to the continuous/progressive hydration process of the invention as illustrated in Example 13 has a relatively high solids content, high reactivity, fine particle size distribution and relatively lower viscosity, as compared to lime slurries made by the prior art processes. The method of the invention would also be less expensive than certain of the existing commercial processes to practice.

While the invention has been shown in several of its forms, it is not thus limited and is susceptible to various changes and modifications without departing from the spirit thereof and from the enclosed claims.

The invention claimed is:

1. Process for manufacturing a milk of lime of great fineness wherein said milk of lime comprises slaked lime particles in suspension into an aqueous phase, the slaked lime particles having a $d_{50}$ greater than or equal to 2 µm and lower than or equal to 6 µm, measured by means of a laser granulometer in methanol, comprising at least the steps of:
   (a) adding water to quicklime instead of addition of quicklime to water to obtain a paste of lime and
   (b) forming a milk of slaked lime of great fineness with said paste of lime.

2. Process for manufacturing a milk of lime of great fineness according to claim 1, wherein said paste of lime is obtained by progressive addition of water to quicklime under agitation conditions.

3. Process for manufacturing a milk of lime of great fineness according to claim 2, wherein said progressive addition of water to quicklime comprises presenting a pattern of addition of water for controlling water uptake by the quicklime when forming the paste of lime.

4. Process for manufacturing a milk of slaked lime of great fineness according to claim 2, wherein said progressive addition to form the paste of lime is a continuous process during which progressive hydration of quicklime is performed by adjusting quicklime feeding rate into a hydrator wherein a predetermined atmosphere is fed containing a limited amount of water for addition of water to quicklime.

5. Process for manufacturing milk of slaked lime of great fineness according to claim 2, wherein progressive addition to form the paste of lime is performed by spraying a mist of water into a hydrator.

6. Process for manufacturing milk of slaked lime of great fineness according to claim 5, wherein said mist of water is a controlled size of droplets of addition of water.

7. Process for manufacturing a milk of lime of great fineness according to claim 1, wherein water added to form said paste of lime comprises an additive selected from the group consisting of carbohydrates, sugars, alcohol sugars, sorbitol, phosphates, sulfates, bicarbonates, silicates, phosphonates, polyacrylates, polycarboxylic acids, low molecular weight organic acids, mixtures and derivatives thereof.

8. Process for manufacturing a milk of lime of great fineness according to claim 1, wherein the slaked lime particles have a $d_{50}$ greater than or equal to 2.5 µm and lower than or equal to 5.5 µm, measured by means of a laser granulometer in methanol.

9. Process for manufacturing a milk of lime of great fineness according to claim 1, wherein the step of forming a milk of slaked lime of great fineness with said paste of lime is a step of adding water to the paste of lime.

10. Process for manufacturing a milk of lime of great fineness according to claim 1, wherein the step of forming a milk of slaked lime of great fineness with said paste of lime is a step of adding paste of lime to water.

11. Process for manufacturing milk of lime of great fineness according to claim 1, wherein said step of forming a milk of slaked lime of great fineness is a batch step by addition of a predetermined amount of said paste of lime into a predetermined amount of water or by addition of a predetermined amount of water into a predetermined amount of said paste of lime to produce said milk of slaked lime of great fineness.

12. Process for manufacturing milk of lime of great fineness according to claim 1, wherein said step of forming a milk of slaked lime of great fineness is a continuous step comprising the steps of feeding said paste of lime into a vessel provided with an exit of milk of slaked lime of great fineness and containing an aqueous suspension of lime and feeding said vessel with water and is followed by an exit of said milk of slaked lime of great fineness thereby obtained.

13. Process for manufacturing a milk of slaked lime of great fineness according to claim 1, wherein the paste of lime is made by a progressive addition of water to quicklime, said progressive addition of water being pursued during the step of forming said milk of slaked lime of great fineness until said milk of slaked lime of great fineness is reached.

14. Process for manufacturing milk of lime of great fineness according to claim 13, wherein said progressive addition of water is carried out by increasing the amount of water added until said predetermined amount of water of the step of forming said milk of slaked lime of great fineness has been added.

* * * * *